(12) United States Patent
Venkataraman et al.

(10) Patent No.: US 11,735,207 B1
(45) Date of Patent: Aug. 22, 2023

(54) SYSTEMS AND METHODS FOR DETERMINING A NEXT ACTION BASED ON WEIGHTED PREDICTED EMOTIONS, ENTITIES, AND INTENTS

(71) Applicant: WELLS FARGO BANK, N.A., San Francisco, CA (US)

(72) Inventors: Vinothkumar Venkataraman, Bangalore (IN); Rahul Ignatius, Bangalore (IN); Naveen Gururaja Yeri, Bangalore (IN); Paul Davis, Irving, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 124 days.

(21) Appl. No.: 17/449,473

(22) Filed: Sep. 30, 2021

(51) Int. Cl.
*G10L 15/26* (2006.01)
*G10L 25/63* (2013.01)
*H04M 3/58* (2006.01)
*H04M 3/523* (2006.01)

(52) U.S. Cl.
CPC .............. *G10L 25/63* (2013.01); *G10L 15/26* (2013.01); *H04M 3/523* (2013.01); *H04M 3/58* (2013.01)

(58) Field of Classification Search
None
See application file for complete search history.

(56) References Cited

U.S. PATENT DOCUMENTS

| | | | |
|---|---|---|---|
| 8,238,541 B1* | 8/2012 | Kalavar | H04M 3/5233 379/265.06 |
| 8,688,453 B1* | 4/2014 | Joshi | G10L 15/00 707/738 |
| 2004/0082839 A1 | 4/2004 | Haugen | |
| 2009/0002178 A1 | 1/2009 | Guday et al. | |
| 2014/0163960 A1* | 6/2014 | Dimitriadis | G10L 25/63 704/9 |
| 2014/0244249 A1* | 8/2014 | Mohamed | G10L 25/63 704/233 |
| 2015/0193718 A1 | 7/2015 | Shaburov et al. | |

(Continued)

OTHER PUBLICATIONS

Mustaqeem, M. Sajjad and S. Kwon, "Clustering-Based Speech Emotion Recognition by Incorporating Learned Features and Deep BiLSTM," in IEEE Access, vol. 8, p. 79861-79875, 2020, doi: 10.1109/ACCESS.2020.2990405.

(Continued)

*Primary Examiner* — Nafiz E Hoque
(74) *Attorney, Agent, or Firm* — Womble Bond Dickinson (US) LLP

(57) ABSTRACT

Systems, apparatuses, methods, and computer program products are disclosed for predicting an entity, intent, and emotion based on weighted and segmented portions of captured speech. An example method includes capturing speech and separating the speech and/or text derived from the speech into a plurality of discrete segments. The example method further includes determining or generating metadata, the metadata an entity, an intent, an emotion, and a weight associated with each of the entity, the intent, the emotion. The example method further includes determining a next action based on the determined or generated entity, intent, and emotion of each of the plurality of discrete segments.

20 Claims, 16 Drawing Sheets

```
┌─ 302
│ Customer Information:
│ Name: xxxx xxxxx
│ Phone Number: xxx-xxx-xxxx
│ Email address: xxxxxxx@xxx.com
│
│ Current Call Wait Time: x:xx:xx
│ Customer Issue: xxx xxxx xxxx xxxx
│
│ Predicted Emotion: Angry
│ Entity: Mortgage
│ Customer Intent: Missed mortgage payment fees
│
│ Was Call Escalated: [Yes/No]
│
│ Previous Call In Emotions:
│ Angry [Date], Issue [xxx], Resolution [xxx]
│ Happy [Date], Issue [xxx], Resolution [xxx]
│
│ NEXT Action:
│ Transfer to Agent xxx xxxx
└─
```

(56) References Cited

U.S. PATENT DOCUMENTS

| | | | |
|---|---|---|---|
| 2015/0288818 A1* | 10/2015 | Srivastava | G06F 40/10 |
| | | | 379/88.01 |
| 2016/0071126 A1 | 3/2016 | Chang et al. | |
| 2017/0116177 A1 | 4/2017 | Walia | |
| 2017/0169101 A1 | 6/2017 | Walia et al. | |
| 2018/0285641 A1 | 10/2018 | Yan et al. | |
| 2018/0303397 A1 | 10/2018 | Krupat et al. | |
| 2018/0308487 A1 | 10/2018 | Goel et al. | |
| 2020/0104616 A1 | 4/2020 | El et al. | |
| 2020/0356999 A1* | 11/2020 | Pandey | G06Q 30/016 |
| 2021/0043099 A1* | 2/2021 | Du | G06N 3/006 |
| 2021/0050033 A1 | 2/2021 | Bui et al. | |
| 2021/0097267 A1 | 4/2021 | Stokman et al. | |
| 2021/0287656 A1* | 9/2021 | Bonafonte | G10L 15/1815 |
| 2022/0043938 A1* | 2/2022 | Kochura | H04L 65/1089 |

OTHER PUBLICATIONS

Robinson, Kerry, "Natural language IVR—what, why, how?," VoxGen Limited, Sep. 27, 2019.
Nuance website, https://www.nuance.com/omni-channel-customer-engagement/technologies/natural-language-understanding, 2021.
SmartAction website, https://www.smartaction.ai/intelligent-front-door/, 2021.
Zen et al., "Learning Personalized Models for Facial Expression Analysis and Gesture Recognition", IEEE Transactions on Multimedia, vol. 18, No. 4, Apr. 2016, pp. 1-14.

* cited by examiner

302

Customer Information:
Name: xxxx xxxxx
Phone Number: xxx-xxx-xxxx
Email address: xxxxxx@xxx.com Current Call Wait Time: x:xx:xx
Customer Issue: xxx xxxx xxxx xxxx Predicted Emotion: Angry
Entity: Mortgage
Customer Intent: Missed mortgage payment fees Was Call Escalated: [Yes/No]

Previous Call In Emotions:
Angry [Date], Issue [xxx], Resolution [xxx]
Happy [Date], Issue [xxx], Resolution [xxx]

NEXT Action:
Transfer to Agent xxx xxxx

FIG. 3

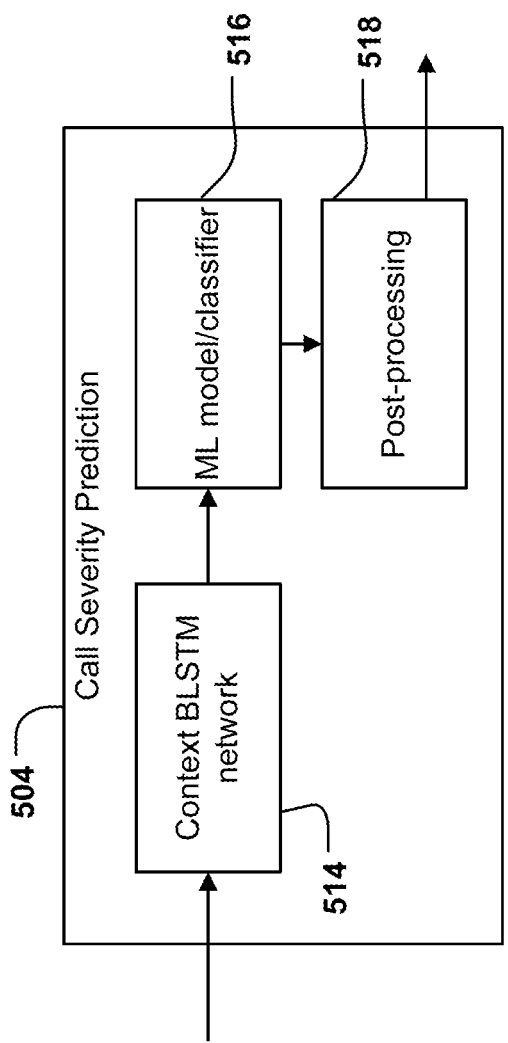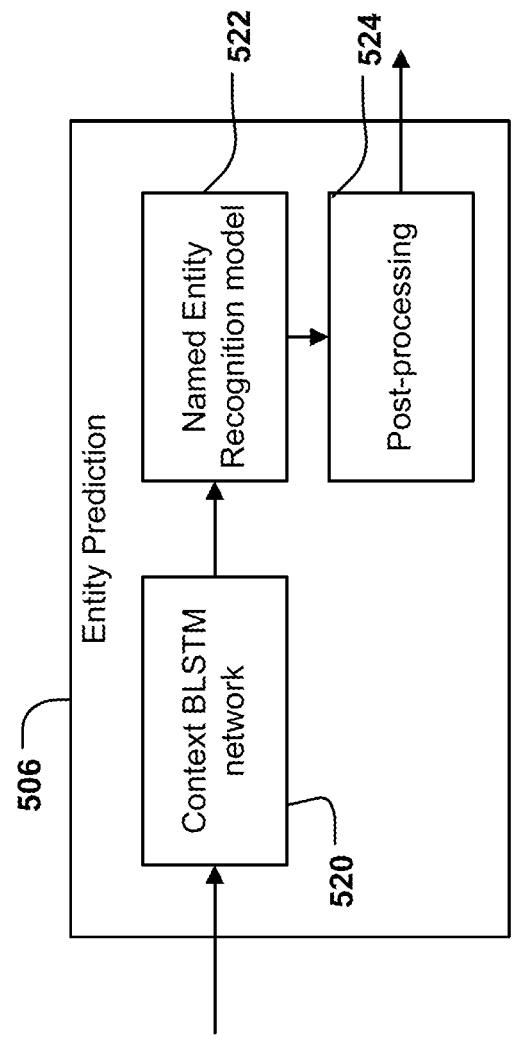

US 11,735,207 B1

SYSTEMS AND METHODS FOR DETERMINING A NEXT ACTION BASED ON WEIGHTED PREDICTED EMOTIONS, ENTITIES, AND INTENTS

TECHNOLOGICAL FIELD

Example embodiments of the present disclosure relate generally to predicting an entity, intent, and emotion based on discrete segmented portions of captured speech and, more particularly, to systems and methods for determining a next action based on a predicted entity, intent, and emotion, the predicted entity, intent, and emotion based on discrete segmented portions of captured speech.

BACKGROUND

Many institutions, such as banks and other service and product providers, offer Interactive Voice Response (IVR) systems. Currently, customers or other users who call in to customer service centers are routed through different IVR paths based on choices that the customer makes (e.g., selecting an option from a menu of options). It takes, at least, several minutes before the customer is routed to an agent or the final IVR point. The current call routing methodologies are not intelligent, but are rules-based (e.g., based on customer selections from the generic or broad IVR menus). Calls are not assigned or re-directed to agents based on anything more than the previously mentioned selections. Further, there is currently no way for an IVR system to understand the tone, emotion, and intent displayed by a customer. This lack of personalization decreases customer satisfaction. For example, rules-based systems may cause certain customers to experience longer delays than they would experience in a more personalized interaction, thus exacerbating any potential frustration or anger the customer had already experienced prior to the call.

BRIEF SUMMARY

Emotion prediction is utilized in various fields today. However, IVR systems today do not effectively harness the opportunities afforded by various emotion prediction systems. Further, in conjunction with or separately from the emotion prediction systems, entity and intent predictions are not utilized by IVR systems today. For instance, emotion predictions, entity predictions, and/or intent predictions are not utilized when determining where and how to redirect customer calls to maximize customer satisfaction and/or minimize customer dissatisfaction.

Accordingly, Applicant has recognized a need for systems, methods, and apparatuses for predicting entity, intent, and emotion based on segmented portions of captured speech, the predicted entity, intent, and emotion being utilized to ensure that a customer call is routed quickly and properly. Utilizing the context of a customer's speech, based on the text derived from the speech, as well as acoustic features derived from actual audio of the customer's speech, example embodiments detect a customer's emotion and intent for use in directing a call or reaching a prompt resolution, as well as detecting an entity in relation to the customer's issue or call/interaction. Moreover, Applicant has recognized a need to utilize this combination to create a process that is more efficient than typical IVR systems. To this end, example systems described herein analyze the speech captured from a customer's call and text derived from the audio or speech. Based on this analysis, example embodiments may predict an entity and the customer's emotion and intent, which in turn may be utilized in transferring or re-directing a call and/or in determining a solution.

Systems, apparatuses, methods, and computer program products are disclosed herein for predicting an emotion, entity, and intent based on weighted, segmented, and discrete speech and/or text derived from the speech based on a captured speech or a portion of captured speech. The predicted entity, intent, and emotion, in addition to the weighting of each discrete segment or prediction, may be utilized to determine the next best action or personalized action. For instance, the customer's call may be directed to an agent capable of handling the intended purpose of the customer's call or customer's in the particular customer's current emotional state. For example, as a customer calls into an IVR system, the customer may be prompted to give a response. As the customer provides a response, the customer's response may be captured, separated into discrete segments, and each discrete segment weighted and analyzed to determine a predicted emotion, entity, and intent of each discrete segment. Based on such a predicted entity, intent, and emotion, the call may or may not be transferred to a live agent or a particular IVR menu, each part of the predicted entity.

In one example embodiment, a method is provided for predicting an entity, intent, and emotion based on weighted and segmented portions of captured speech. The method may include receiving, by communications circuitry, a reply comprising speech. The method may include converting, by automatic speech recognition circuitry, speech to text. The method may include separating, by the automatic speech recognition circuitry, the text into a plurality of discrete segments. Each of the plurality of discrete segments may correspond to a respective specific time. The method may include causing, by one or more of the automatic speech recognition circuitry, an entity and intent prediction circuitry, and an emotion prediction circuitry, generation of metadata including an entity, an intent, an emotion, and a weight associated with each of the entity, the intent, the emotion. The method may include determining, by call processing circuitry, a next action based on the metadata.

In an embodiment, the method may include, prior to conversion of the speech to text, pre-processing, by speech pre-processing circuitry, the speech.

In another embodiment, the reply may be a portion of a call. In such an embodiment, the method may include determining, by the call processing circuitry, if the call has ended. The method may include, in response to a determination that the call has ended, determining, by the call processing circuitry, if an agent processed the call. The method may include, in an instance in which the call has ended and an agent processed the call, analyzing, by the call processing circuitry, agent performance in relation to one or more of the determined entity, intent, and predicted emotion. The method may include, in an instance in which the call has ended and an agent did not process the call, analyzing, by the call processing circuitry, call routing at execution of each next action in relation to one or more of the determined entity, intent, and predicted emotion.

In an embodiment, the generation of metadata may include weighting, by automatic speech recognition circuitry, each of the plurality of discrete segments based on the respective specific time to which it corresponds. The respective specific time may indicate when that discrete segment was received. The method may further include determining, by the entity and intent prediction circuitry, an entity related to each of the plurality of discrete segments. The method may further include causing, by the entity and intent prediction circuitry and for each of the plurality of segments, generation of an intent for each of the plurality of discrete segments. The method may include causing, by emotion prediction circuitry and for each of the plurality of segments, generation of a predicted emotion for each one of the plurality of discrete segments. The weighting of each discrete segment of the plurality of discrete segments may be further based on the predicted emotion for that discrete segment.

In another embodiment, the method may further include, prior to determining a next action, determining, by the entity and intent prediction circuitry and for each of the plurality of discrete segments, a severity for each of the plurality of discrete segments. The metadata used for determining the next action may include the severity. The severity may be or may include either a regular severity or an escalated severity. In an embodiment, if the severity is an escalated severity, the next action may include transferring a call associated with the text to an agent. The discrete segments may be weighted based on the respective specific times to which they correspond.

In an embodiment, the method may include, prior to determining the entity for each of the plurality of discrete segments and generation of an intent and predicted emotion for each of the plurality of discrete segments, causing, by the speech pre-processing circuitry and for each of the plurality of discrete segments, generation of a context word vector using one of the plurality of discrete segments and a context Bidirectional Long Short-Term Memory (BLSTM) network. The method may include causing, by the entity and intent prediction circuitry and for each of the plurality of segments, generation of potentially related entities using the context word vector and a named entity recognition model. The determination of the entity may be further based on the potentially related entities. The method may include causing, by the entity and intent prediction circuitry and for each of the plurality of segments, generation of one or more ranked intents based on the context word vector and a support vector machine (SVM) classifier. The generation of the intent may be further based on the one or more ranked intents.

In one example embodiment, an apparatus is provided for predicting an entity, intent, and emotion based on weighted and segmented portions of captured speech. The apparatus may include communications circuitry configured to receive a reply comprising speech. The apparatus may include automatic speech recognition circuitry. The automatic speech recognition circuitry may be configured to convert the speech to text. The automatic speech recognition circuitry may be configured to separate the text into a plurality of discrete segments, each of the plurality of discrete segments corresponding to a respective specific time. The apparatus may include entity and intent prediction circuitry. The entity and intent prediction circuitry may be configured to cause generation of metadata. The metadata may include an entity, an intent, an emotion, and a weight associated with each of the entity, the intent, the emotion. The apparatus may include call processing circuitry. The call processing circuitry may be configured to determine a next action based on the metadata.

In an embodiment, the weight of each of the plurality of discrete segments may be based on the emotion for each of the plurality of discrete segments. The respective specific time may be a time when a particular discrete segment is received. The discrete segments may be weighted based on the respective specific times to which they correspond.

In one example embodiment, a computer program product is provided for predicting an entity and intent based on segmented portions of captured speech, the computer program product comprising at least one non-transitory computer-readable storage medium storing software instructions that, when executed, cause an apparatus to perform various operations and/or processes. The computer program product may be configured to, in response to a reply, capture speech. The computer program product may be configured to convert the speech to text. The computer program product may be configured to separate the text into a plurality of discrete segments. Each of the plurality of discrete segments may correspond to a respective specific time. The computer program product may be configured to cause generation of metadata. The metadata may include an entity, an intent, an emotion, and a weight associated with each of the entity, the intent, the emotion. The computer program product may be configured to determine a next action based on the metadata.

In another embodiment, the speech may be captured from one or more of a customer or an agent. In another embodiment, the metadata may include a severity for each of the plurality of discrete segments. In yet another embodiment, the next action may comprise one or more of re-directing a call from an IVR menu to another IVR menu, selecting an agent based on the metadata, generating a customer's personalized product or service recommendation, re-directing a call based on the customer's personalized product or service recommendation, determining an agent's rating or ranking, generating a call back for a customer, or transferring a call from the IVR menu to an agent The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 3 illustrates an example graphical user interface (GUI) used in some example embodiments described herein.

FIGS. 5A, 5B, 5C, 5D, and 5E illustrate other example schematic block diagrams used in some example embodiments described herein.

DETAILED DESCRIPTION

Figure 1:
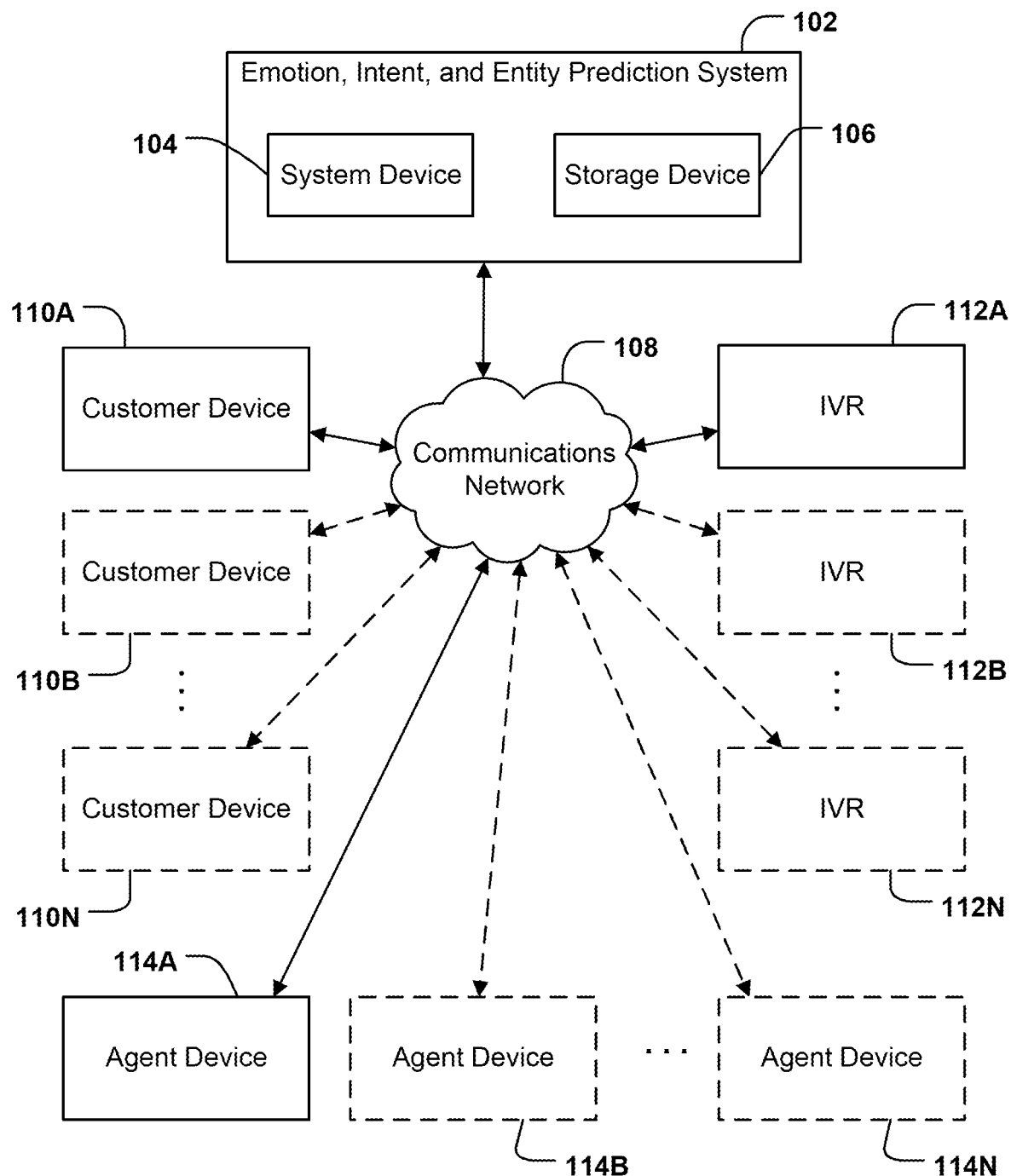
FIG. 1 illustrates a system in which some example embodiments may be used.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for predicting an entity and intent based on segmented portions of captured speech and for predicting an emotion based on speech and text derived from the speech for each segmented portion of the captured speech and, based on the entity, intent, and emotion prediction, in addition to weights associated with each segment or prediction, providing a next best action or personalized action for a customer call. Traditionally, customer service interactions utilize an IVR system. It can take a long time until a customer's issue is resolved or until the customer's call is directed to the proper person. As a call takes longer, customers may grow frustrated and/or angry, but calls will continue on the same path. While a customer's intent, in addition to intended entity, and emotion could be given as feedback after the fact, there is no way for a customer's intent or emotional state to be utilized in determining the best route for the call real-time and/or continuously. There is no way to customize a customer's route through an IVR system. In addition, there is typically no way to determine which employees from a particular entity may be most suited to handle a particular emotion or intent (e.g., no personalized solution). Further, employees are not evaluated or prioritized based on how they handle particular predicted emotions and/or intents and calls are not re-directed to different employees based on such evaluations.

In contrast to these conventional techniques for determining emotion based only on audio or text, the present disclosure describes determining entity, intent, and emotion and/or one or more probabilities indicating one or more intents and/or emotions for each of a discrete segment of text based on speech and text derived from the speech. Further, the determined emotion, entity, intents, or probabilities may be utilized to determine a best call route or redirection, and also to optimize which employees or call center agents receive calls based on predicted entity, intents, and emotions. To address the issues described herein, when a customer calls in, the customer's speech or reply may be captured. All or a portion of the captured speech may be transmitted for audio preprocessing. The pre-processing steps or operations may reduce noise and/or determine a speech endpoint, among other features. The pre-processed audio may then be sent to an audio speech recognition (ASR) module or circuitry. The ASR circuitry may first convert the audio to text. The text may then be separated into a plurality of discrete segments associated with a time that each discrete segment is received. Each discrete segment may then be weighted, by the speech pre-processing circuitry or ASR circuitry, based on a time each discrete segment is received. An entity and intent prediction circuitry may determine for each of the plurality of discrete segments an entity based on one of the plurality of discrete segments. The entity and intent prediction circuitry may cause generation, for each of the plurality of discrete segments, of an intent based on one of the plurality of discrete segments. An emotion prediction circuitry may, for each of the plurality of segments, cause generation of a predicted emotion based on one of the plurality of discrete segments. A call processing circuitry or module may determine a next action based on each determined entity, each generated intent, each predicted emotion, and a weight associated with each determined entity and each generated intent and predicted emotion.

Such operations may be performed or caused by or via machine learning models. For example, entity prediction may be determined via a named entity recognition model. Each of the intents may be generated by a support vector machine (SVM). Further, each of the intents may be generated based on context hidden vectors. The context hidden vectors may be generated via a context Bidirectional Long Short-Term Memory (BLSTM). Finally, the predicted emotions may be based on received speech, in addition to text and/or context hidden vectors, and generated by one or more BLSTM networks.

Accordingly, the present disclosure sets forth systems, methods, and apparatuses that accurately predict an entity, intent, and emotion based on weighted and segmented portions of captured speech and/or text. There are many advantages of these and other embodiments described herein. For instance, reduced call time waiting. As a customer calls into customer service, rather than waiting to get through multiple IVR menus, if a customer's intent, entity, and emotion is determined initially and/or continuously, the system or apparatus may ensure the call is handled in a particular way (e.g., escalation) and by the proper entity (e.g., an agent representing a particular entity or business segment or unit). Such an action and/or other actions describe herein may increase customer satisfaction. In particular, as customer call wait times are reduced, customer satisfaction will increase. Further, for customers experiencing frustration, anger, or other similar negative emotions, prompt redirection and resolution ensure that customer satisfaction may increase. Finally, customers may be transferred or redirected to proper call center agents and, further, the call center agents may be evaluated and classified based on the call center agent's emotion or handling of a customer experiencing a particular emotion. For instance, as a customer's emotion (e.g., anger) is predicted, the call may be re-directed to a call center agent with experience handling customer's experiencing such emotions (e.g., anger).

Moreover, the systems, methods, and apparatuses set forth an improvement to operational execution and efficiency when compared to conventional IVR systems. By making a dynamic determination based on intent, entity, and/or emotion, the described systems, methods, and apparatuses improve the accuracy of routing a customer call to the correct destination. Improved accuracy can provide the benefit of reduced computing resources required to route a customer call, and reduced IVR menu complexity, among other benefits.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, an emotion, intent, and entity prediction system 102 may include a system device 104 in communication with a storage device 106. Although system device 104 and storage device 106 are described in singular form, some embodiments may utilize more than one system device 104 and/or more than one storage device 106. Additionally, some embodiments of the emotion, intent, and entity prediction system 102 may not require a storage device 106 at all. Whatever the implementation, the emotion, intent, and entity prediction system 102, and its constituent system device(s) 104 and/or storage device (s) 106 may receive and/or transmit information via communications network 108 (e.g., the Internet) with any number of other devices, such as one or more of customer device 110A, customer device 110B, through customer device 110N, IVR 112A, IVR 112B, through IVR 112N, and/or agent device 114A, agent device 114B, through agent device 114N.

System device 104 may be implemented as one or more servers, which may or may not be physically proximate to other components of emotion, intent, and entity prediction system 102. Furthermore, some components of system device 104 may be physically proximate to the other components of the emotion, intent, and entity prediction system 102 while other components are not. System device 104 may receive, process, generate, and transmit data, signals, and electronic information to facilitate the operations of the emotion, intent, and entity prediction system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the emotion, intent, and entity prediction system 102. Storage device 106 may store information relied upon during operation of the emotion, intent, and entity prediction system 102, such as various audio recordings and speech-to-text files that may be used by the emotion, intent, and entity prediction system 102, data and documents to be analyzed using the emotion, intent, and entity prediction system 102, or the like. In addition, storage device 106 may store control signals, device characteristics, and access credentials enabling interaction between the emotion, intent, and entity prediction system 102 and one or more of the customer devices 110A-110N, IVRs 112A-112N, or agent devices 114A-114N.

The one or more IVR 112A-112N may be embodied by any storage devices known in the art. Similarly, the one or more customer device 112A-112N and/or agent device 114A-114N may be embodied by any computing devices known in the art, such as desktop or laptop computers, tablet devices, smartphones, or the like. The one or more customer devices 110A-110N, the one or more IVRs 112A-112N, and the one or more agent devices 114A-114N need not themselves be independent devices, but may be peripheral devices communicatively coupled to other computing devices.

Although FIG. 1 illustrates an environment and implementation of the present disclosure in which the emotion, intent, and entity prediction system 102 interacts with one or more of customer devices 110A-110N, IVRs 112A-112N, and/or agent devices 114A-114N, in some embodiments one or more of the users or agents may directly interact with the emotion, intent, and entity prediction system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the emotion, intent, and entity prediction system 102 to perform functions described herein and/or achieve benefits as set forth in connection with this disclosure.

Example Implementing Apparatuses

Figure 2:
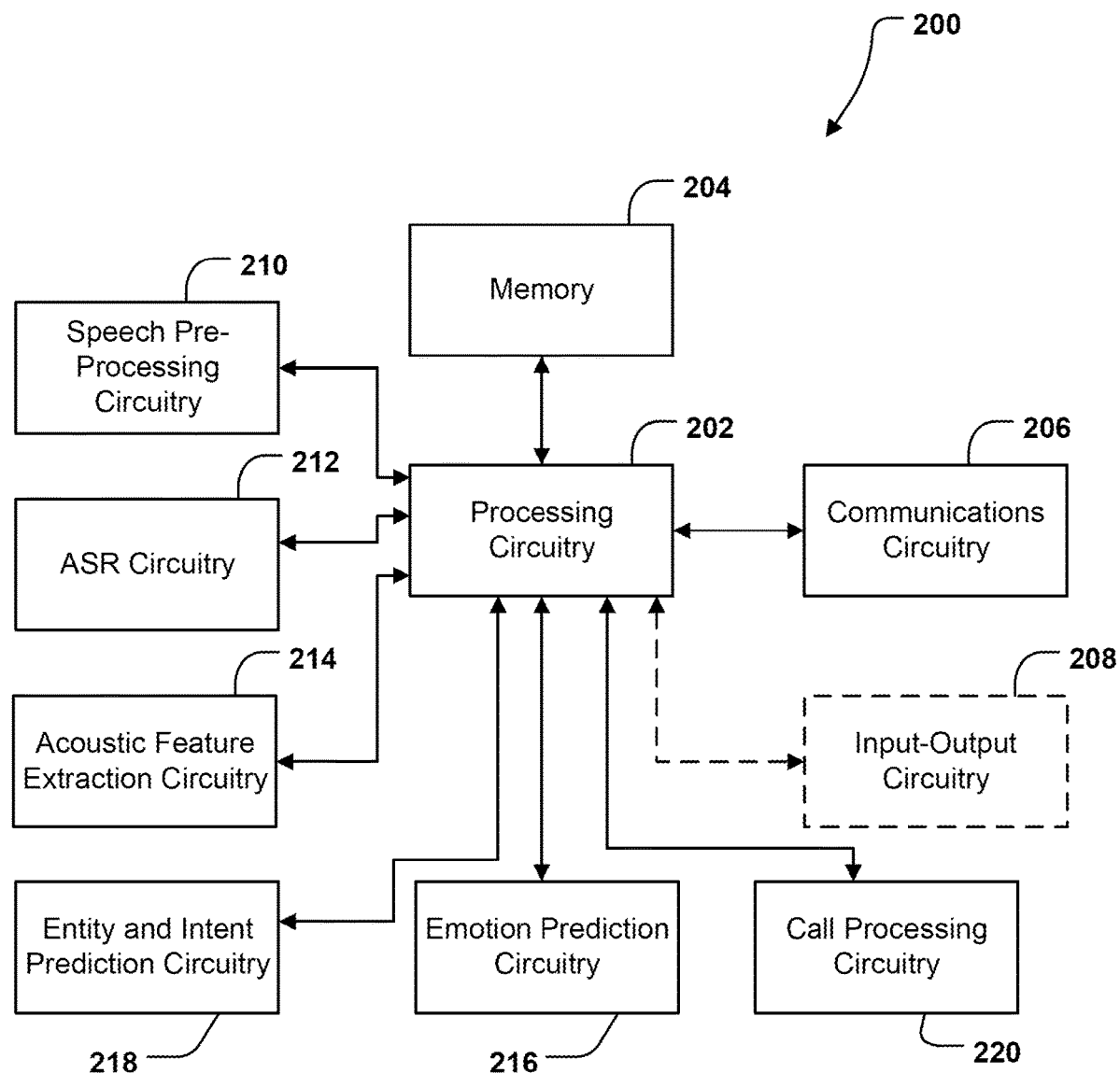
FIG. 2 illustrates a schematic block diagram of example circuitry embodying a device that may perform various operations in accordance with some example embodiments described herein.

System device 104 of the emotion, intent, and entity prediction system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, Speech pre-processing circuitry 210, audio speech recognition (ASR) circuitry 212, acoustic feature extraction circuitry 214, emotion prediction circuitry 216, entity and intent prediction circuitry 218, and call processing circuitry 220 each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 6A-8B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a customer device 110A-110N and/or agent device 114A-114N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises speech pre-processing circuitry 210 that pre-processes audio input from a customer, agent, or other user and/or may perform other actions or processing regarding audio or text based input from a customer, agent, and/or other user. The speech pre-processing circuitry 210, for example, may separate the pre-processed speech and/or text (received from ASR circuitry 212) into a plurality of discrete segments associated with a time each discrete segment is received. The speech pre-processing circuitry 210 may weight each of the plurality of discrete segments based on a time each discrete segment is received and/or other factors. The speech pre-processing circuitry 210 may utilize processor 202, memory 204, or any other hardware component included in the apparatus 200 to perform these operations, as described in connection with FIGS. 5A-8B below. The speech pre-processing circuitry 210 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to process audio input from a customer, agent, or other user. The output of the speech pre-processing circuitry 210 may be transmitted to other circuitry of the apparatus 200 (e.g., ASR circuitry 212 and/or acoustic feature extraction circuitry 214). In an embodiment, the speech pre-processing circuitry 210, prior to pre-processing, may capture a reply or speech or a portion of a reply or speech from a customer and/or agent. In another embodiment, the reply or speech or a portion of a reply or speech from a customer and/or agent may be captured by other circuitry and provided or transmitted to the speech pre-processing circuitry 210.

In addition, the apparatus 200 further comprises an ASR circuitry 212 that converts audio to text and may create a context related hidden vector via a context BLSTM network (e.g., an ELMo) included, for example as instructions, in the ASR circuitry 212. The ASR circuitry 212 may also, rather than the speech pre-processing circuitry 210, separate the pre-processed speech and/or text into a plurality of discrete segments associated with a time each discrete segment is received. The ASR circuitry 212 may also, rather than the speech pre-processing circuitry 210, weight each of the plurality of discrete segments based on a time each discrete segment is received and/or other factors. The ASR circuitry 212 may utilize processor 202, memory 204, or any other hardware component included in the apparatus 200 to perform these operations, as described in connection with FIGS. 5A through 8B below. The ASR circuitry 212 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to convert audio to text, to create a context related hidden vector, and/or create a hidden vector from the context related hidden vector including likelihoods of particular emotions. The output of the ASR circuitry 212 may be transmitted to other circuitry of the apparatus 200 (e.g., emotion prediction circuitry 216).

In addition, the apparatus 200 may also comprise an acoustic feature extraction circuitry 214 that extracts various features from customer, agent, or other user audio and may create a hidden vector via an included BLSTM network. As used herein, a BLSTM network may refer to a type of neural network, recurrent neural network, or other trained machine learning algorithm, as will be understood by a person skilled in the art. In an embodiment, the portion of audio which various features are extracted from may correspond to a time of one of the plurality of discrete segments. In such an embodiment, the apparatus 200 may extract the various features for each of the one of the plurality of discrete segments. The acoustic feature extraction circuitry 214 may utilize processor 202, memory 204, or any other hardware component included in the apparatus 200 to perform these operations, as described in connection with FIGS. 6A through 6C below. The acoustic feature extraction circuitry 214 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to create a hidden vector including likelihoods of particular emotions. The output of the acoustic feature extraction circuitry 214 may be transmitted to other circuitry of the apparatus 200 (e.g., emotion prediction circuitry 216).

In addition, the apparatus 200 may also comprise an emotion prediction circuitry 216 that, utilizing the output from the ASR circuitry 212 and the acoustic feature extraction circuitry 214, outputs a prediction of a customer's, agent's, or other user's emotion. Additionally, rather than creating such vectors in the ASR circuitry 212 and the acoustic feature extraction circuitry 214, the emotion prediction circuitry 216 may, utilizing outputs from the ASR circuitry 212 and the acoustic feature extraction circuitry 214, create one or more different vectors. For example, the emotion prediction circuitry 216 may create text hidden vectors using the context hidden vectors and a text BLSTM network, create a context related hidden vector via a context BLSTM network, and/or create an audio hidden vector via an included audio BLSTM network. The emotion prediction circuitry 216 may create word aligned hidden vectors using the audio hidden vectors, the text hidden vectors, and an attention layer. Further, the emotion prediction circuitry 216 may create hidden vectors using the word aligned hidden vectors, the text hidden vectors, and a final BLSTM network.

Further, the emotion prediction circuitry 216 may reduce dimensionality of the hidden vector via a max-pooling layer, generate an emotion vector of a size determined by a number of emotions considered using the reduced dimensionality hidden vector via a fully connected layer, normalize the emotion vector to thereby form one or more probabilities corresponding to one or more emotions, and/or calculate a probability distribution based on the one or more probabilities corresponding to one or more emotions. Such operations or processes may be performed for each of the plurality of discrete segments. In other words, emotions may be predicted for each of the plurality of discrete segments. Such predictions may also occur continuously, for as long as speech is received from a customer, agent, and/or other user. The emotion prediction circuitry 216 may utilize processor 202, memory 204, or any other hardware component included in the apparatus 200 to perform these operations, as described in connection with at least FIGS. 5A through 8B below. The emotion prediction circuitry 216 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to create a number or probability indicative of a customer's, agent's, or other user's emotion. The output of the emotion prediction circuitry 216 may be transmitted to other circuitry of the apparatus 200. The emotion prediction circuitry 216 may further determine a next best action for a call based on the number or probability indicative of the customer's, agent's or other user's emotion. The output of emotion prediction circuitry 216 may be transmitted to other circuitry of the apparatus 200 (e.g. call processing circuitry 220).

In addition, the apparatus 200 may also comprise an entity and intent prediction circuitry 218, that, utilizing each of the plurality of discrete segments, outputs a prediction of a customer's, agent's, or other user's intent and/or an entity related to the particular discrete segment (e.g., which entity may be responsible for or able to assist with, for example, a particular request). The entity and intent prediction circuitry 218 may include or store, as instructions, machine learning models or classifiers. Using the machine learning models or classifiers, the entity and intent prediction circuitry 218 may determine, generate, or predict an intent, one or more intents per discrete segment, an entity, one or more entities per discrete segment, or some combination thereof. The entity or one or more entities may be determined via a machine learning model or classifier. The machine learning model or classifier may include a named entity recognition model, custom trained named entity recognition model, or other suitable model. Based on words used in the speech, an entity or one or more entities may be determined or an indeterminate entity may be output. The intent or one or more intents may also be determined via another machine learning model or classifier. The machine learning model or classifier may include, for example, a SVM classifier. In particular, the SVM classifier may be a one-vs-rest SVM or a one-vs-one SVM. If more than one intent is determined, the entity and intent prediction circuitry 218 may determine the main intent and sub-intents from the more than one intents, based on a probability or ranking associated with each identified intent. The entity and intent prediction circuitry 218 may utilize processor 202, memory 204, or any other hardware component included in the apparatus 200 to perform these operations, as described in connection with FIGS. 5A through 8B below. The entity and intent prediction circuitry 218 may also determine, via a machine learning model or classifier, the severity of a call (e.g., whether the call is a typical, regular, or normal call or whether the call is an escalated severe and should be escalated).

The entity predicted by the entity and intent prediction circuitry 218 may include a business entity, a product or service entity, business segment, call service entity, call service division or segment, service center, customer service center, or another entity suitable for handling customer calls or issues. For example, a financial institution may include various entities related to particular products or services offered, including, but not limited to, an account entity, a loan entity, a credit card entity, a mortgage entity, an auto loan entity, and/or other entities. In another example, a company that offers products for sales may include various entities, each entity related to a particular type or series of products, a service entity, a warranty entity, a sales entity, an issue related entity, and/or other entities suitable for handling customer calls or issues for any particular reason.

The intent predicted by the entity and intent prediction circuitry 218 may include the reason a customer is calling and/or an issue a customer is attempting to resolve. An intent may be known by the customer. In an example, a customer may call to resolve a particular issue, the resolution to such an issue being the intent. Further, a customer may have one or more intents. Further still, an intent may be unknown by the customer. In other words, the intent predicted may not have been known by the customer or may not have been the original intent of the customer.

The entity and intent prediction circuitry 218 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to determine or create an entity and/or number or probability indicative of a customer's, agent's, or other user's intent. The output of the entity and intent prediction circuitry 218 may be transmitted to other circuitry of the apparatus 200. The entity and intent prediction circuitry 218 may further determine a next best action for a call, in conjunction with or separate from emotion prediction circuitry 216, based on the entity and the number or probability indicative of the customer's, agent's or other user's intent. The output of entity and intent prediction circuitry 218 may be transmitted to other circuitry of the apparatus 200 (e.g. call processing circuitry 220).

Finally, the apparatus 200 may also comprise a call processing circuitry 220 that, utilizing the output for each of the plurality of the discrete segments from the emotion prediction circuitry 216, entity and intent prediction circuitry 218, and/or the weight of each of the plurality of the discrete segments, may determine and execute the next action. The call processing circuitry 220 may utilize processor 202, memory 204, or any other hardware component included in the apparatus 200 to perform these operations, as described in connection with at least FIGS. 6A through 8B below. The call processing circuitry 220 may further utilize communications circuitry 206 and/or input-output circuitry 208 to perform or execute the next action. For example, the next action may be to transfer a call from an IVR (e.g., IVR 112A-112N) to an agent (e.g., to an agent device 110A-110N). In such examples, the call processing circuitry 220 may facilitate or otherwise cause a call to be re-directed from the IVR to the agent. The call processing circuitry 220 may perform other functions, such as re-directing calls from one particular IVR menu to another, selecting a particular agent based on an emotion exhibited by a customer, storing a customer's personalized product or service recommendation, re-directing a call based on the customer's personalized product or service recommendation, determining an agent's rating or ranking, and/or generating a call back for a customer. The call processing circuitry 220 may determine a customer's personalized product or service recommendations based on the text of the customer's speech, the context of the speech, the entity or entities determined from the customer's speech, and/or the customer's intent. For example, a customer may call a service center to discuss an overdraft fee or other fee. During replies to an IVR or agent, the customer may mention different products or services. Based on the text, context, and intent associated with such a mention, the call processing circuitry 220 may, after initial issue resolution, recommend a product or service, prompt an agent to recommend a product or service, and/or re-direct the call to an IVR or agent corresponding to the recommended product or service.

In another embodiment, the call processing circuitry 220 may perform other functions. The call processing circuitry 220 may determine product recommendations and/or service recommendations based on text captured during a customer's interaction whether with an IVR or agent. For example, if a customer mentions a credit card or a particular loan, the call processing circuitry 220 may determine that a product or service recommendation includes credit counseling, a new credit card, or a new type of loan, among other products or services. Such product or service recommendations may be given to the customer at varying points during a call (such as, after issue resolution) via an IVR, an agent, as a call-back, and/or via a form of electronic communication (text message, e-mail, etc.), among other suitable communication methods as will be understood by a person skilled in the art. As noted, the call processing circuitry 220 may re-direct calls to different live agents or IVR menus. For example, if a customer mentions a credit card issue, but is currently interacting with a different IVR (e.g., mortgages), the customer may be re-directed to a credit card IVR. The call processing circuitry 220 may further direct calls based on other factors, such as determined entities, customer intent, live agent qualities, characteristics, and/or other objective data (e.g., business unit or group). For example, if the customer exhibits a particular emotion, such as anger, rather than re-directing the call to another IVR, the call may be re-directed to an agent. Further still, the agent may be chosen based on the agent's history handling particular emotions, the live agent's product or service group, and/or based on other agent characteristics or qualities.

Although components 202-220 are described in part using functional language, it will be understood that the particular implementations necessarily include the use of particular hardware. It should also be understood that certain of these components 202-220 may include similar or common hardware. For example, the Speech pre-processing circuitry 210, ASR circuitry 212, acoustic feature extraction circuitry 214, emotion prediction circuitry 216, and call processing circuitry 220 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the speech pre-processing circuitry 210, ASR circuitry 212, acoustic feature extraction circuitry 214, emotion prediction circuitry 216, entity and intent prediction circuitry 218, and call processing circuitry 220 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the Speech pre-processing circuitry 210, ASR circuitry 212, acoustic feature extraction circuitry 214, emotion prediction circuitry 216, and entity and intent prediction circuitry 218 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200 Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

GUI

Turning to FIG. 3, a graphical user interface (GUI) 302 is provided that illustrates what an agent sees after a prediction is made. As noted previously, the agent may interact with the emotion, intent, and entity prediction system 102 by directly engaging with input-output circuitry 208 of an apparatus 200 comprising a system device 104 of the emotion, intent, and entity prediction system 102. In such an embodiment, the GUI 302 shown in FIG. 3 may be displayed to the agent by the apparatus 200. Alternatively, the agent may interact with the emotion, intent, and entity prediction system 102 using a separate agent device (e.g., any of agent devices 114A-114N, as shown in FIG. 1), which may communicate with the emotion, intent, and entity prediction system 102 via communications network 108. In such an embodiment, the GUI 302 shown in FIG. 3 may be displayed to the agent by the agent device.

As described herein, a customer may call a customer service center from a customer device (e.g., any of customer devices 110A-110N, as shown in FIG. 1). The customer may respond to prompts transmitted by an IVR (e.g., any of IVRs 112A-112N). This information may be received by the emotion, intent, and entity prediction system 102, which may in turn identify the customer's emotion and intent, in addition to relevant entities, and may, based on that identified entity and customer emotion and intent, cause the call to be transferred from the IVR (e.g., any of IVRs 112A-112N) to an agent device (e.g., one of agent devices 114A-114N). In addition to causing transfer of the call to the agent device, various data points may be transmitted to the agent device. The GUI 302 may thereafter present such information for review by the agent using the agent device. The information may include a customer's personal information, the reason (if known) that a customer called, a customer call history, the current entity handling the call, the customer's predicted intent, and the customer's predicted emotion. In such examples, the agent receiving the call may receive the call based on the agent's experience handling a particular intent and/or customers experiencing the predicted emotion. Knowledge of the customer's predicted emotion and intent may allow for the agent to prepare and act appropriately to address the customer more successfully than may otherwise be expected. The forwarding of the call may be based on various other information, such as the caller's emotion history, the caller's current emotion, the customer's additional intents and/or entities, and/or other information.

Example Operations

Figure 4A:
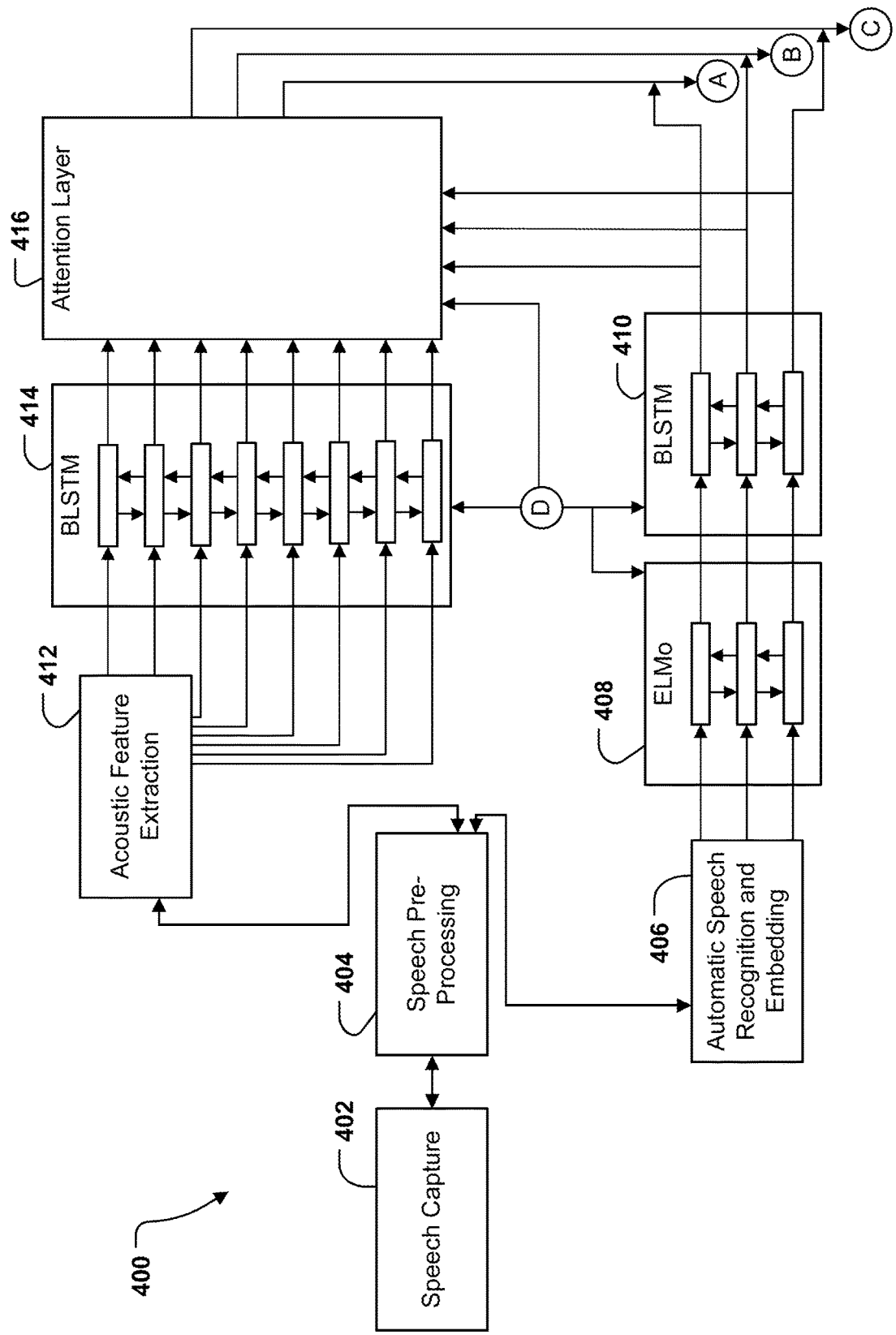
FIGS. 4A and 4B illustrate example schematic block diagrams used in some example embodiments described herein.
Figure 4B:
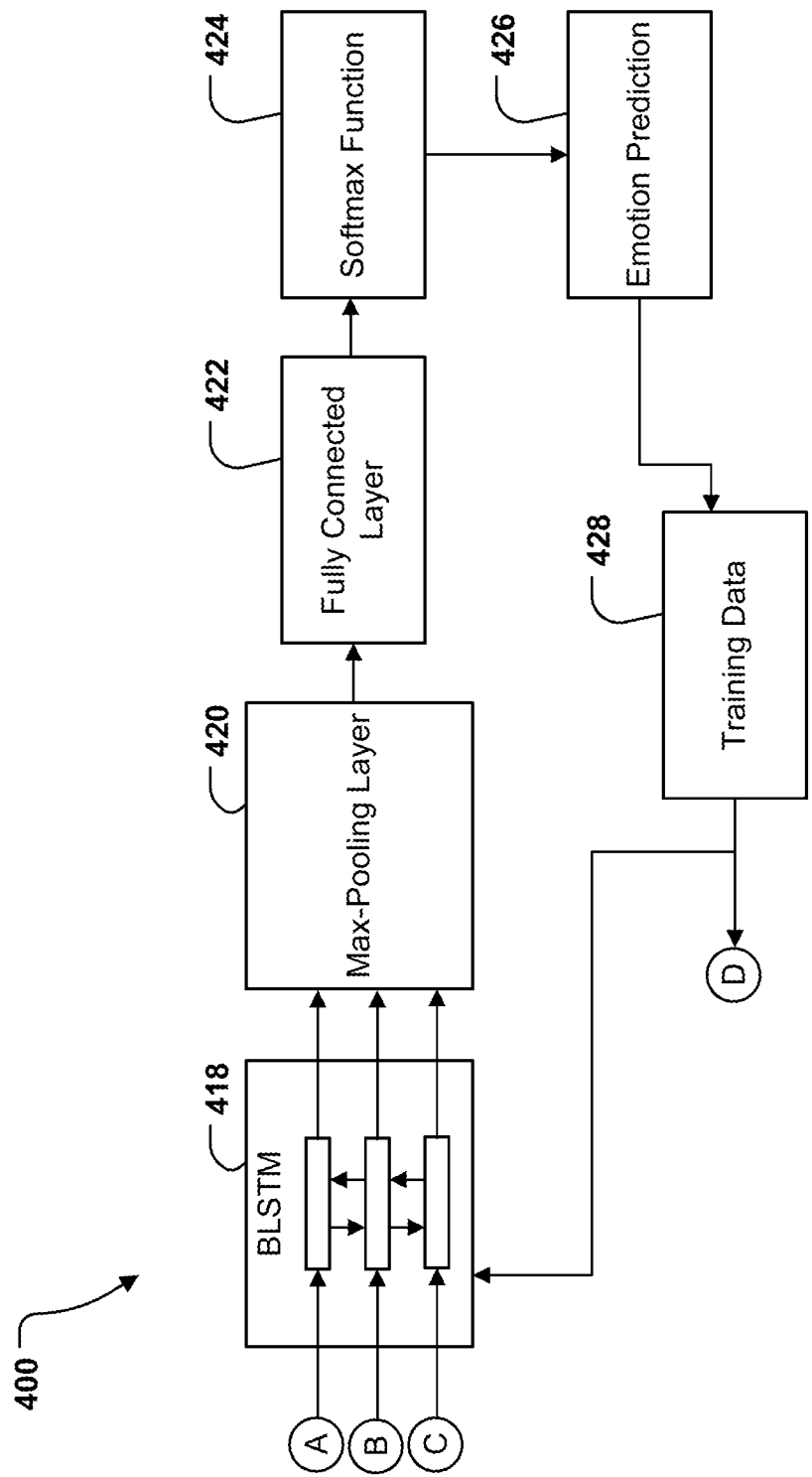

Turning first to FIGS. 4A and 4B, a schematic block diagram 400 is shown that represents an example emotion prediction flow, as implemented in emotion, intent, and entity prediction system 102 and/or apparatus 200. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, entity and intent prediction circuitry 218, call processing circuitry 220, and/or any combination thereof. It will be understood that user interaction with the emotion, intent, and entity prediction system 102 may occur directly via input-output circuitry 208, or may instead be facilitated by a separate IVR 112A-112N, as shown in FIG. 1, and which may have similar or equivalent physical componentry facilitating such user interaction.

As illustrated in FIG. 4A, such an example may begin with speech capture 402. Circuitry of apparatus 200 (e.g., such as speech pre-processing circuitry 210) may capture or record speech or a reply from a customer, agent, and/or other user at 402. The captured speech may be transmitted for speech pre-processing 404 (e.g., such an operation performed or executed by speech pre-processing circuitry 210). The speech pre-processing 404 may reduce noise of the captured speech, determine an end point of the captured speech, or perform other functions to enable further enable emotion prediction. In an embodiment, prior to transfer of the pre-processed the speech, the speech pre-processing circuitry 210 may separate the speech (as audio and/or text) into a plurality of discrete segments. As such, each of the plurality of discrete segments may be analyzed separately, one after the other, or in parallel. After separating the speech and/or text into the plurality of discrete segments, the speech pre-processing circuitry 210 may weight each of the plurality of discrete segment based on various factors (e.g., time, emotion change, and/or other factors).

Next, acoustic features may be extracted from the pre-processed speech or one of the plurality of discrete segments at 412. Such a feature may be performed or executed by the acoustic feature extraction circuitry 214. Acoustic feature extraction 412 may include extracting or separating each different acoustic feature from the captured pre-processed speech. Such acoustic features may include zero crossing rate, spectral centroid, spectral spread, spectral entropy, spectral flux, spectral roll-off, and/or Mel frequency cepstral coefficients. Each acoustic feature may be transmitted, as a vector or as part of a vector, to an acoustic feature or audio BLSTM network 414. The acoustic feature or audio BLSTM network 414 may output an audio hidden vector relating to the likelihood of an emotion for a particular acoustic feature. The audio hidden vector may be transmitted to an attention layer 416.

In addition, the captured speech, reply, or each of the plurality of discrete segments may be transmitted for ASR and embedding 406. Such a feature may be performed or executed by ASR circuitry 212 of the apparatus 200. ASR and embedding 406 may include converting the pre-processed speech or each of the plurality of discrete segments to text. In another embodiment, prior to transfer to the ASR circuitry 212 the captured speech may not be separated into a plurality of discrete segments. As such, the ASR circuitry 212 may separate the captured speech and/or the text into the plurality of discrete segments. The ASR circuitry 212 may further weight each of the plurality of discrete segments based on various factors (e.g., time, emotion change, and/or other factors).

The text or plurality of discrete segments may be transmitted to a context BLTSM network, for example ELMo 408. The ELMo 408 may create or generate a context or ELMo hidden vector relating to the context of each word or subset of words in the text. The context or ELMo hidden vector may then be transmitted to a text BLSTM network 410. The text BLSTM network 410 may create or generate a text hidden vector relating to an emotion of text based on the context and word choice of the text, among other aspects. The text BLSTM network 410 may transmit the text hidden vector to the attention layer 416 and further to an additional BLSTM network 418.

As noted, the text hidden vector and audio hidden vector may be transmitted to an attention layer 416. The attention layer 416 is used to learn the alignment between the hidden vectors corresponding to speech and text features (e.g., from text BLSTM network 410 and audio BLSTM network 414). As hidden vectors related to speech are less in number compared to the hidden vectors related to text, the word aligned hidden vectors are created using the attention layer. Each word aligned hidden vector is created as the normalized weighted sum of the speech hidden vectors. These normalized weights act as attentions and are obtained as the weighted combination of the speech and text hidden vectors where the weights/parameters are learned during training. The word aligned hidden vectors and text hidden vectors are concatenated and are further processed using a BLSTM network to learn the representations that are optimal for emotion prediction.

The output of the attention layer 416 and the output of the text BLSTM network 410 may be transmitted, as illustrated in FIG. 4B, to the additional BLSTM network 418 to further refine the emotion prediction. The output vector of the additional BLSTM network 418 may then be transmitted to a max-pooling layer 420. The max-pooling layer 420 may be used to reduce the dimension of the hidden vectors obtained from the additional BLSTM network 418 which, in turn, avoids high complexity in the following fully connected network, the complexity depending on the input dimension. The max-pooling layer 420 uses a sliding kernel on the input vector and for each kernel placement, the maximum value is considered in the output vector. Likewise, the output vector is obtained by considering maximum values from the input vector. The output vector may be transmitted to a fully connected layer 422. In the fully connected layer 422, the inputs from one layer are connected to every node of the next layer. The network complexity (number of weights) depends on the input dimension and number of hidden layers. The last layer in the fully connected layer 422 outputs an M-dimensional vector where M is the number categories of emotions that are considered. The M-dimensional vector may be transmitted to a Softmax function 424. Determining an emotion may be treated as a multi-class classification problem. Thus, Softmax activation is used which is a generalization of logistic function to multiple dimensions. The Softmax function 424 takes the M-dimensional vector from the fully connected layer 422 and normalizes it into probability distribution consisting of M probabilities. Thus, the output of the Softmax function 424 consists of values between 0 and 1. The emotion class corresponding to the maximum probability score is considered as a final prediction from the model (e.g., see emotion prediction 426).

The final prediction for the speech or each of the plurality of discrete segments of the speech may be utilized to determine a personalized or next best action. In another embodiment, a predicted emotion for each of the plurality of discrete segments may be utilized, in addition to or separately from time and/or other factors, in weighting each of the plurality of discrete segments. Further, the predicted emotion may be utilized or compiled into training data 430. The training data 430 may be utilized, along with the text and audio, to refine and/or retrain any of the BLSTM networks as described herein.

Such actions or functions, as described in relation to FIGS. 4A and 4B, may be performed, stored in, and/or executed by the circuitry of apparatus 200 and/or the emotion, intent, and entity prediction system 102. For example, each BLSTM network in FIGS. 4A and 4B may be stored, as instructions, in memory 204 and/or emotion prediction circuitry 216 and may be utilized by emotion prediction circuitry 216.

Turning next to FIGS. 5A through 5E, a schematic block diagram 500 is shown that represents an example emotion, intent, and prediction flow, as implemented in the emotion, intent, and entity prediction system 102 and/or apparatus 200. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, entity and intent prediction circuitry 218, call processing circuitry 220, and/or any combination thereof. It will be understood that user interaction with the emotion, intent, and entity prediction system 102 may occur directly via input-output circuitry 208, or may instead be facilitated by a separate IVR 112A-112N, as shown in FIG. 1, and which may have similar or equivalent physical componentry facilitating such user interaction.

Figure 5A:
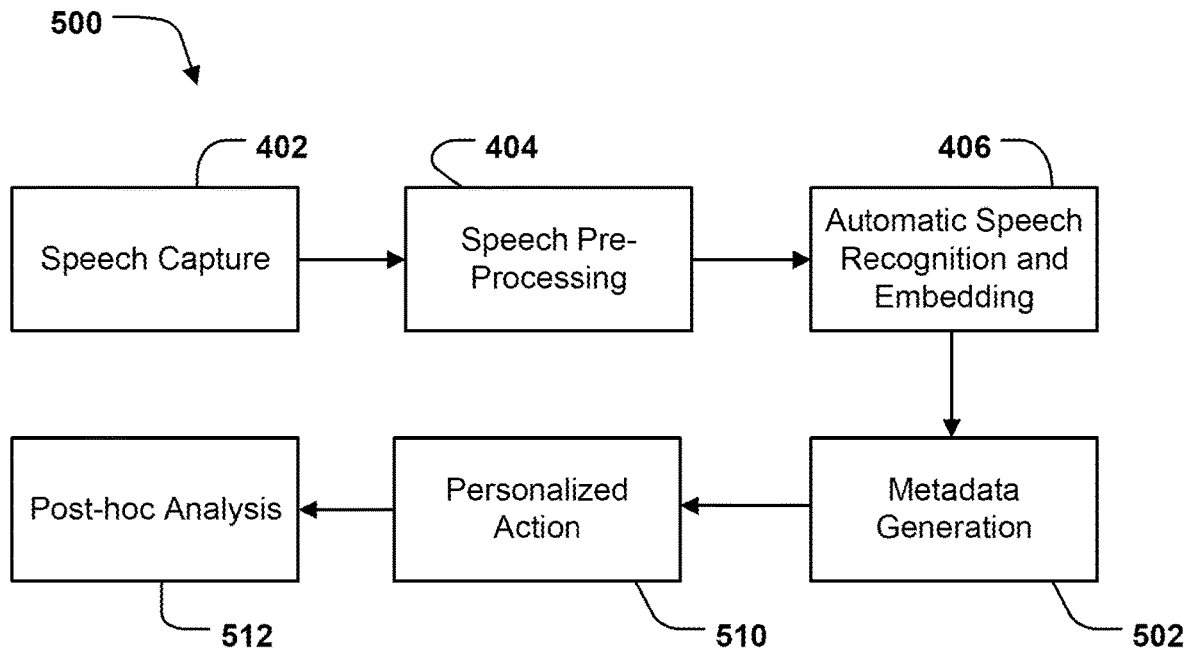

As illustrated in FIG. 5A, such an example may begin with similar or the same operations as described in FIG. 4A. For example, FIG. 5A may begin with speech capture 402 via circuitry of apparatus 200 (e.g., such as speech pre-processing circuitry 210). The captured speech may be transmitted for speech pre-processing 404 (e.g., such an operation being performed or executed by speech pre-processing circuitry 210). The speech pre-processing 404 may reduce noise of the captured speech, determine an end point of the captured speech, or perform other functions to further enable emotion prediction. As noted, prior to transfer of the pre-processed the speech, the speech pre-processing circuitry 210 may separate the speech (as audio and/or text) into a plurality of discrete segments. As such, each of the plurality of discrete segments may be analyzed separately, one after the other, or in parallel. In another embodiment, such a separation of speech into a plurality of discrete segments may occur after conversion to text. In other words, the text may be separated into a plurality of discrete segments. For example, each of the plurality of discrete segments may comprise about 5 seconds to about 20 seconds segment of speech and/or text. The length of each of the plurality of discrete segments may be a specified or pre-determined length. Further, the speech pre-processing circuitry 210 or other circuitry of apparatus 200 may weight each of the plurality of discrete segments based on various factors (e.g., time, emotion change, and/or other factors).

In addition, the captured speech, reply, or each of the plurality of discrete segments may be transmitted for ASR and embedding 406. Such a feature may be performed or executed by ASR circuitry 212 of the apparatus 200. ASR and embedding 406 may include converting the pre-processed speech or each of the plurality of discrete segments to text. Each of the plurality of discrete segments me be passed through a context BLSTM to create a number of context hidden vectors (e.g., ELMo 408 from FIG. 4A).

Figure 5B:
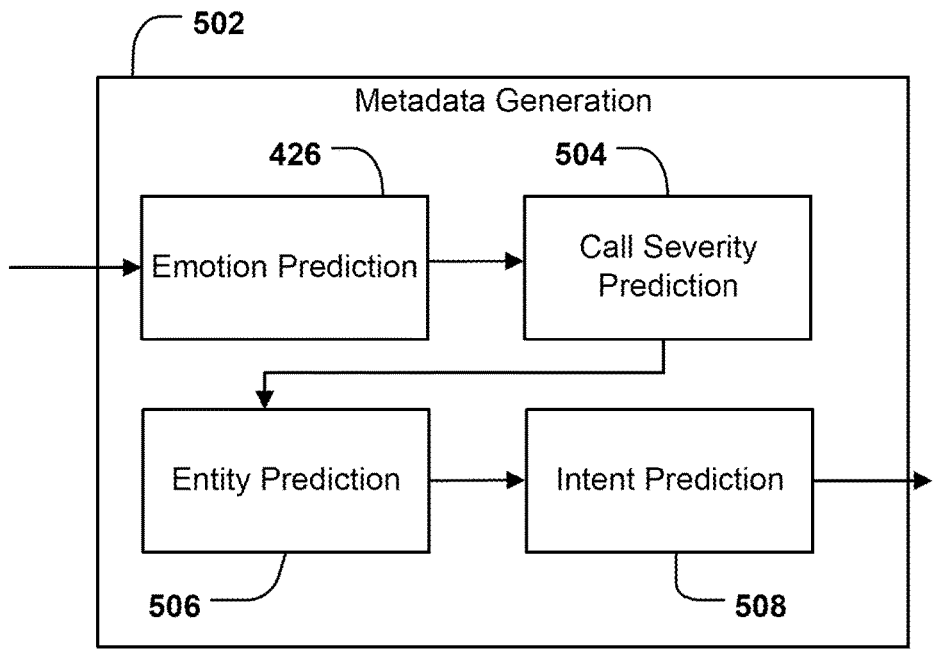
Figure 5E:
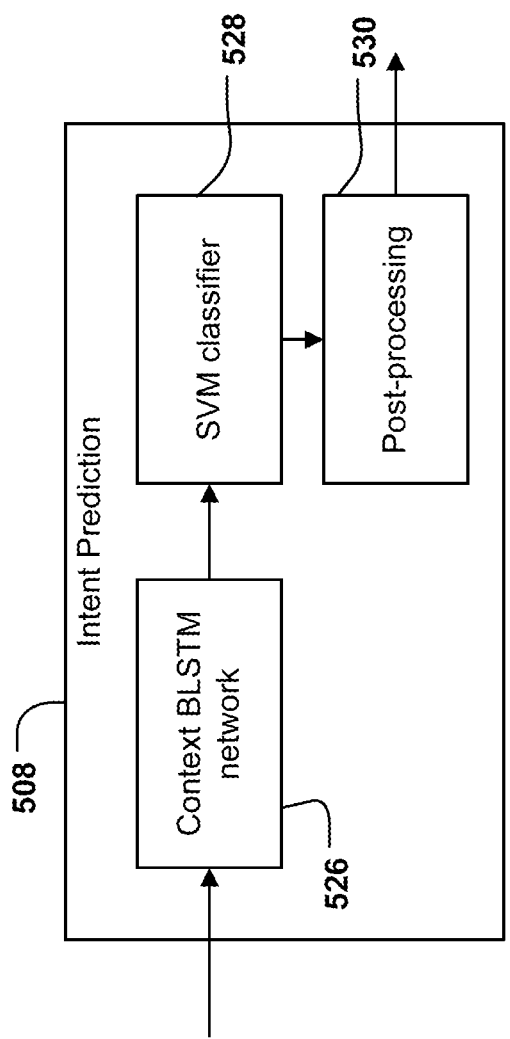

In an embodiment, the schematic block diagram may include metadata generation 502. Metadata generation may be caused by or occur at or in one or more of the speech pre-processing circuitry 210, ASR circuitry 212, an entity and intent prediction circuitry 218, or emotion prediction circuitry 216. Metadata may include one or more of one or more predicted emotions (e.g., as generated for each of the plurality of discrete segments at emotion prediction 426), one or more predicted severities (e.g., as generated for each of the plurality of discrete segments at call severity prediction 504), one or more predicted entities (e.g., as generated for each of the plurality of discrete segments at entity prediction 506), one or more predicted intents (e.g., as generated for each of the plurality of discrete segments at intent prediction 508), and/or weights for each of the plurality of discrete segments (e.g., as generated at speech pre-processing 404, ASR and embedding 406, emotion prediction 426, entity prediction 506, and/or intent prediction 508). As such, metadata generation 502, as illustrated in FIG. 5B, may include one or more sub-processes or routines, such as emotion prediction 426, call severity prediction 504, entity prediction 506, and/or intent prediction 508. In an embodiment, after metadata generation 502, a personalized action 510 may be determined and post-hoc analysis 512 may be performed, as will be described in further detail below.

As illustrated in FIG. 5B, an emotion may be predicted for each of the plurality of discrete segments at emotion prediction 426. Such an emotion prediction may be determined or generated as illustrated in FIGS. 4A-4B and FIGS. 7A-7C. Each determined or generated emotion may be stored or saved with a weight associated with a particular discrete segment. In another embodiment, the predicted emotions may be utilized to determine the weights. For example, for a particular portion of speech from a customer, one or more emotions may be generated. The customer may initially be angry, but as the customer speaks, such emotions can change, for example, to happy. In such an example, a discrete segment may include a predicted emotion of angry, while other discrete segments may include happy. In such examples, the weight of a discrete segment may be higher based on the last emotion, rather than the initial emotion. In another example, the weight of the discrete segments may be based on the emotion, such as angry, frustrated, or similar emotions may be weighted higher than happy or satisfied.

Once one or more emotions are predicted, a call severity prediction 504 may be generated. The entity and intent prediction circuitry 218 may include a model to determine such a severity, such as the machine learning model/classifier 516 illustrated in FIG. 5C. The severity prediction may include the severity of the call, with a higher or escalated severity requiring more urgent attention and a lower or regular severity requiring less urgent attention. For example, a call may be a typical or regular call or an escalated severity call. A regular call may be transferred along normal routes, depending on other factors (e.g., emotions, intents, and/or entities). Handling of an escalated severity or high severity call may be expedited, such that the call is escalated or transferred directly to an agent capable of handling such a call without moving through the normal call routing pathways. In another embodiment, based on a prediction of a severe call, the next action may include, at least, transferring the call to a live agent, rather than another IVR. As noted, the entity and intent prediction circuitry 218 may include a model/classifier. The model/classifier may include a trained model. The type of machine learning model may include a linear regression model, a logistic regression model, a decision tree model, a SVM model, a Naive Bayes model, a kNN model, a k-means model, a random forest model, a dimensionality reduction model, a neural network, a gradient boosted algorithm/model, and/or other suitable models, as will be understood by a person skilled in the art. If the call is severe, the entity and intent may be predicted, as will be described below, and then the next action (e.g., transfer to an agent, as the call is severe) executed. As illustrated in FIG. 5C, the call severity prediction 504 may include several sub-routines or instructions. For example, call severity prediction 504 may or may not include a context BLSTM network 514, while in another embodiment, context hidden vectors may be created prior to the call severity prediction. The ML model/classifier 516 may take the context hidden vectors or one of the plurality of discrete segments and output a number indicating a severity. In another embodiment, the number may be from 0 to 1, the number indicating a likelihood that the call is severe or normal. An optional post-processing 518 operation or step may format the output to a usable format and/or associate the probability with a weight.

Once the severity is determined or predicted, an entity or entities may be predicted for each of the one or more discrete segments at entity prediction 506. Prior to analyzing any of the discrete segments, the discrete segment may be passed or transmitted to a context BLSTM network 520 to form context hidden vectors. Such a step may occur prior to or separate from the entity prediction, e.g., the input to entity prediction 506 may be a context hidden vector. The entity and intent prediction circuitry 218 may include a model to determine the entities, such as the named entity recognition model 522 illustrated in FIG. 5D, a customized named entity recognition model, another context model, and/or other suitable machine learning model as will be understood by those skilled in the art. A speech comprised of the plurality of discrete segments may potentially relate to more than one entity. In other words, an entity prediction 506 may output one or more entities. The entities may be weighted according to or correspondingly with the weighted discrete segments. As such, the highest weighted entity and/or most identified and highest weighted entity may be the entity that the call is transferred to. If more than one entity is determined, the remaining entities may be saved and utilized in a personalized recommendation or follow up action. The output of the model or classifier may be a number indicating a particular entity. In another example, the output may be a string or text string indicating the entity. Such steps or operations, e.g., weighting or determining a main entity, may be performed as a post-processing 524 operation.

Once the one or more entities are determined, one or more intents may be determined at intent prediction 508. Prior to analyzing any of the discrete segments, the discrete segment may be passed or transmitted to a context BLSTM network 526 to form context hidden vectors. Such a step may occur prior to or separate from the intent prediction, e.g., the input to intent prediction 508 may be a context hidden vector. The entity and intent prediction circuitry 218 may include a model to determine the entities, such as the SVM classifier 528 illustrated in FIG. 5E, a one-vs-one SVM model, a one-vs-rest SVM model, and/or other suitable machine learning model as will be understood by those skilled in the art. In an embodiment, one or more intents may be determined for each of the plurality of discrete segments. The one or more intents may be ranked. The highest ranked intent for each discrete segment may be the main intent for each discrete segment. Once each of the intents for each of the discrete segments are determined, the highest ranked and/or highest weighted intent may be selected as the main overall intent. The main overall intent may be used to determine the next action. Other machine learning models may be utilized. The output may be a number indicating a particular intent. In another embodiment, the output may be a vector including a series of intents and associated likelihoods of being the actual intent of the customer. Such steps or operations, e.g., weighting or determining a main intent and sub-intents, may be performed as a post-processing 530 operation.

Turning back to FIG. 5A, once the metadata for a call is generated (e.g., once the severity of the call, one or more entities, and one or more intents are determined or predicted), a personalized action 510 may be determined. All the obtained determinations and/or predictions for a discrete segment may be analyzed in relation to the metadata or the determined entities, intents, emotions, and related weights of each other discrete segment. Based on such analysis, a next action may be determined. For example, if a call is severe, the personalized or next action may be to transfer the call to an agent of a particular determined or predicted entity. In another example, for a normal call, the personalized or next action may include transferring the call to a particular IVR or an agent or delivering a particular question, each option based on the one or more entities and one or more intents. The analysis described above may be performed at each step in or portion of a customer interaction (e.g., for each customer reply or speech, a personalized or next action may be determined). In an embodiment, the personalized or next action may include several steps or stages. For example, a first action may be to transfer a call to a particular agent. Once a resolution is reached, the next action may be to suggest a product or service, based on the determinations and/or predictions described above.

After the personalized actions are performed, post-hoc analysis 512 may be performed. The post-hoc analysis may include determining how an agent performed based on progressing customer emotion, determining whether a call was directed to the proper IVR, and/or determining whether a call was directed to the proper entity, among other analysis.

Such actions or functions, as described in relation to FIGS. 5A through 5E, may be performed, stored in, and/or executed by the circuitry of apparatus 200 and/or the emotion, intent, and entity prediction system 102. For example, each BLSTM network or other models/classifiers (e.g., ML model/classifier 516, a named entity recognition model 522, or SVM classifier 528) in FIGS. 5C through 5E may be stored, as instructions, in memory 204, emotion prediction circuitry 216, and/or entity and intent prediction circuitry 218 and may be utilized by emotion prediction circuitry 216 and/or entity and intent prediction circuitry 218.

Figure 6A:
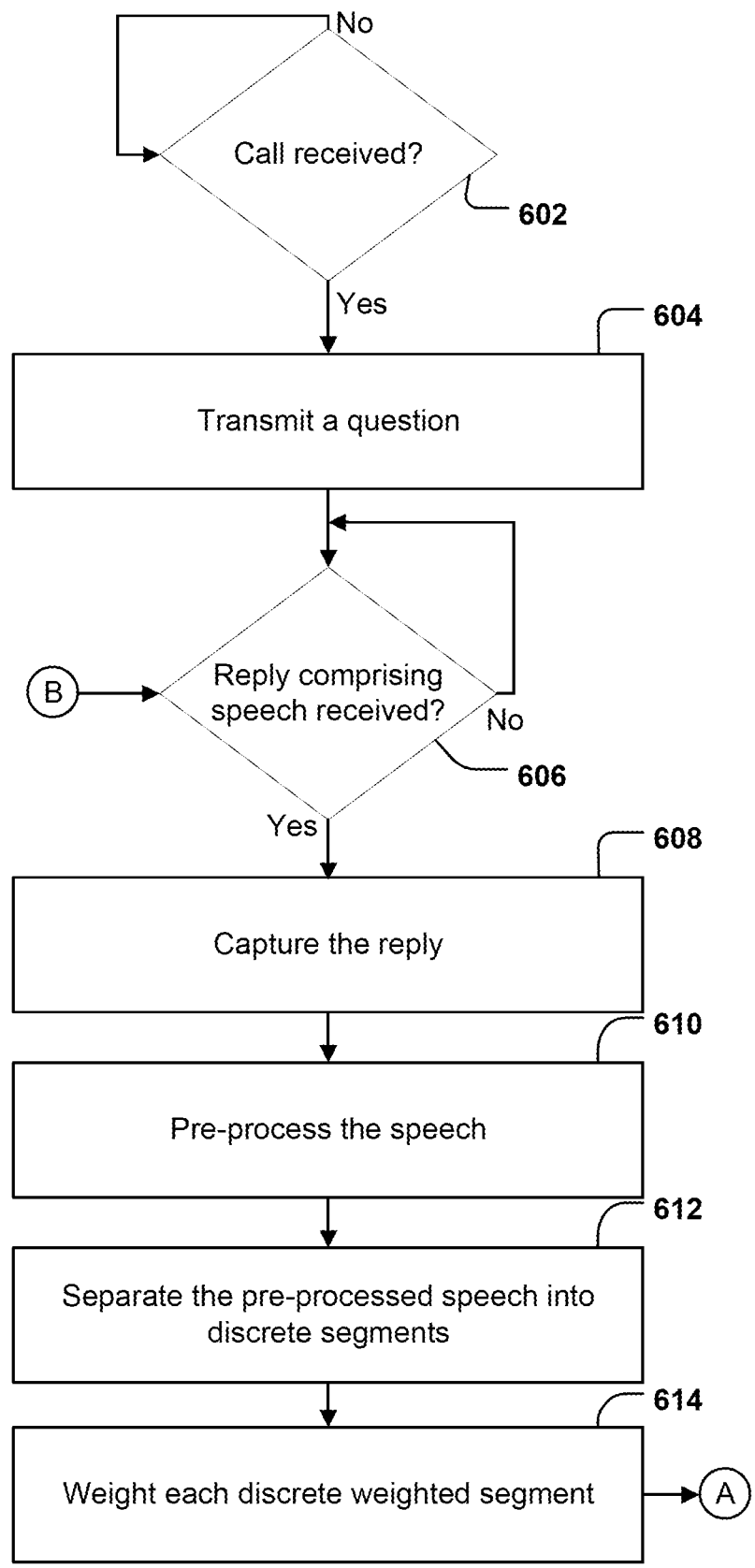
FIGS. 6A, 6B, and 6C illustrate example flowcharts for generating an emotion, entity, and intent prediction and determining a next an action or next best action or call routing, in accordance with some example embodiments described herein.
Figure 6B:
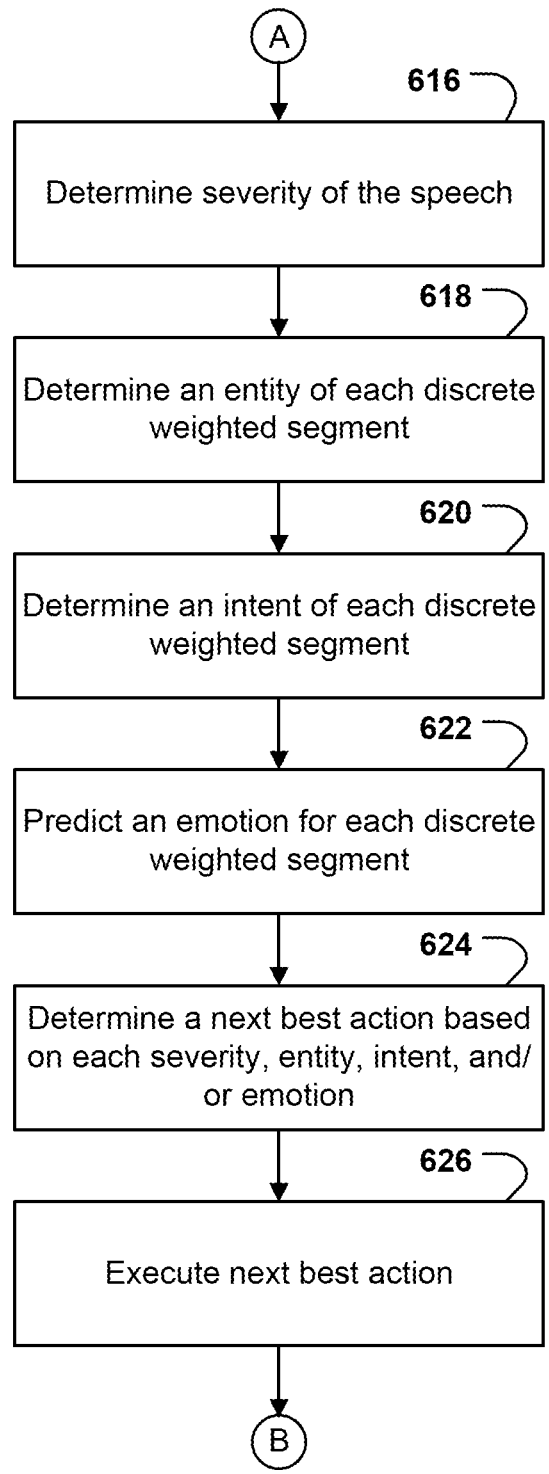
Figure 6C:
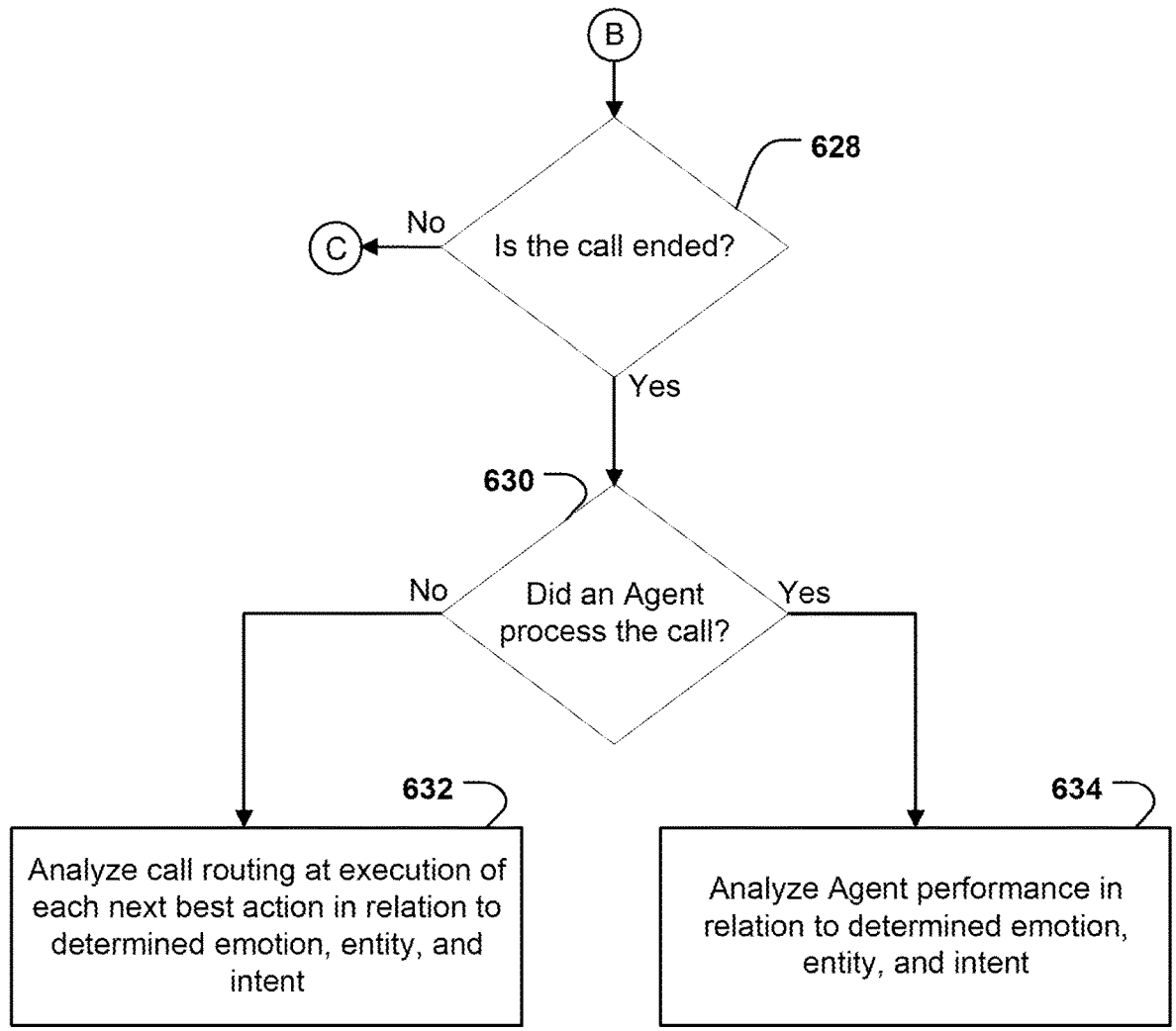

Turning next to FIGS. 6A through 6C, example flowcharts are illustrated that contain example operations implemented by example embodiments described herein. The operations illustrated in FIGS. 6A through 6C may, for example, be performed by system device 104 of the emotion, intent, and entity prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, entity and intent prediction circuitry 218, call processing circuitry 220, and/or any combination thereof. It will be understood that user interaction with the emotion, intent, and entity prediction system 102 may occur directly via input-output circuitry 208, or may instead be facilitated by a separate IVR 112A-112N, as shown in FIG. 1, and which may have similar or equivalent physical componentry facilitating such user interaction.

As shown by operation 602, the apparatus 200 includes means, such as processor 202, communications circuitry 206, input-output circuitry 208, Speech pre-processing circuitry 210, or the like, for determining whether a call is received. Such a feature may be performed in IVR circuitry or systems, such as any of the IVRs 112A-112N.

As shown by operation 604, the apparatus 200 includes means, such as processor 202, communications circuitry 206, input-output circuitry 208, Speech pre-processing circuitry 210, or the like, for transmitting a question to a caller (e.g., a customer or other user). Such a feature may be performed in IVR circuitry or systems, such as any of the IVRs 112A-112N, or other automated systems. The question may be given to the caller via a voice prompt. The circuitry, automated system, or IVR may prompt the user with a number of different messages, such as "how can I help you" or by asking another, more specific question in response to a previous reply.

As shown by operation 606, the apparatus 200 includes means, such as processor 202, communications circuitry 206, input-output circuitry 208, Speech pre-processing circuitry 210, or the like, for determining whether a whether a call has been received. Such a feature may be performed in IVR circuitry or systems, such as any of the IVRs 112A-112N, or other automated systems.

As shown by operation 608, the apparatus 200 includes means, such as processor 202, communications circuitry 206, input-output circuitry 208, Speech pre-processing circuitry 210, or the like, for capturing speech from a customer. Speech or a reply may be captured in response to a determination that a customer has or is beginning to reply. The capture of speech may be performed in response to a customer providing a vocal response to a prompt. As the customer starts speaking, the customer's response may be recorded by, for example, the speech pre-processing circuitry 210 or other circuitry included in apparatus 200. As the customer proceeds through different responses, each segment of speech may be recorded. In another example, the customer may be responding to an agent. In addition to the capture of the customer's speech, the agent's speech may be captured and processed. As such, an emotion or emotions may be predicted for a customer, an agent, and/or some other user.

As shown by operation 610, the apparatus 200 includes means, such as Speech pre-processing circuitry 210 or the like, for pre-processing the speech. The speech pre-processing circuitry 210 may reduce any noise, background noises, other voices not relevant to the conversation, and/or other anomalies. The speech pre-processing circuitry 210 may reduce noise, background noise, background voices, and/or other noise, by amplifying high frequencies and/or via other denoising techniques as will be understood by those skilled in the art. Further, speech pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined.

As shown by operation 612, the apparatus 200 includes means, such as Speech pre-processing circuitry 210, ASR circuitry 212, emotion prediction circuitry 216, entity and intent prediction circuitry 218, or the like, for separating the pre-processed speech into a plurality of discrete segments. The discrete segments may be determined based on a predetermined or specified amount of time per segment. For example, a discrete segment may include about 5 seconds to about 30 seconds of speech or a longer time interval. In relation to text for a discrete segment, the text of each segment may correspond to about 5 seconds to about 30 seconds of speech or longer. Each discrete segment may include an indicator to indicate when the discrete segment was received. The indicator may include a time stamp, counter, or other suitable indicator.

As shown by operation 614, the apparatus 200 includes means, such as Speech pre-processing circuitry 210, ASR circuitry 212, emotion prediction circuitry 216, entity and intent prediction circuitry 218, or the like, for weighting each of the plurality of discrete segments. Such a weight may include a number between 0 and 1. The weight may be determined based on various factors. The various factors may include the time that the discrete segment was received, the emotion associated with the discrete segment, a change in emotion from one discrete segment to another discrete segment, and/or other factors. For example, as a customer interacts with an IVR or agent, the customer's emotion may change, e.g., such as from happy to angry or surprised to happy, among other emotional changes. The emotion that the customer shifts to may be given greater weight than the prior emotion. In another example, weighting may correspond to when the discrete segment is given as speech. In an example, an earlier portion of speech may be weighted higher than a later portion of speech. In such examples, such a weighting may occur for an initial or first response. As a conversation or interaction proceeds, a higher weighting may be given to a later portion of speech, rather than an earlier portion. In an embodiment, the operation 614 may occur at a later or different point in time, for example, after emotion, intent, and entity are predicted.

As shown by operation 616, the apparatus 200 includes means, such as entity and intent prediction circuitry 218 or the like, for determining a severity of the speech or call. The severity of a call may be determined by transmitting the text of the call or context hidden vectors, as generated by a context BLSTM network, to a trained machine learning model or classifier. The machine learning model or classifier may output a probability or likelihood indicating the severity of a call. Such a probability or likelihood may be indicated by a number between 0 and 1. Based on a predefined threshold, an output above such a threshold may indicate the call is severe, while an output at or below such a threshold may indicate that the call is a regular call.

As shown by operation 618, the apparatus 200 includes means, such as entity and intent prediction circuitry 218 or the like, for determining an entity of each discrete weighted segment. The entity and intent prediction circuitry 218 may include a model or classifier to determine one or more entities for a discrete segment. The model or classifier may, based on the input (e.g., the discrete segment or a context hidden vector), generate one or more probabilities or likelihoods that the input is indicating one or more entities. In another embodiment, the output may indicate a most likely entity. In yet another embodiment, the output may indicate a main entity and potential sub-entities. For example, a customer may call to discuss a missed mortgage payment, but also mention a potential personal loan or credit card. In such an example, based on a customer's speech, a main entity may be identified, via output from the entity and intent prediction circuitry 218, as being related to mortgages, while a sub-entity may be identified by entity and intent prediction circuitry 218 related to personal loans or credit.

As shown by operation 620, the apparatus 200 includes means, such as entity and intent prediction circuitry 218 or the like, for determining an intent of each discrete weighted segment. The entity and intent prediction circuitry 218 may include a model or classifier to determine one or more intents for a discrete segment. The model or classifier may, based on the input (e.g., the discrete segment or a context hidden vector), generate one or more probabilities or likelihoods that the input is indicating one or more intents. In another embodiment, the output may indicate a most likely intent. In yet another embodiment, the output may indicate a main intent and potential sub-intents. The main intent may be determined based on a ranking of each intent. The highest ranked intent may be classified as the main intent. The remaining intents may be considered sub-intents.

As shown by operation 622, the apparatus 200 includes means, such as emotion prediction circuitry 218 or the like, for predicting an emotion for each discrete weighted segment. The emotion prediction circuitry 216 may include one or more different models to predict the emotion or one or more emotions for each discrete segment, as described in relation to FIGS. 7A through 7C.

In an embodiment, the operations 614, 616, 618, 620, and/or 622 may be included in or a part of a metadata generation operation performed by apparatus 200. In such an embodiment, additional data may be generated. Further, the metadata generated in each operation may be generated in parallel (e.g., each operation may be executed at the same time), in series (e.g., one operation is performed after another), or some combination thereof.

As shown by operation 624, the apparatus 200 includes means, such as emotion prediction circuitry 216, entity and intent prediction circuitry 218, or the like, for determining a next best action based on each severity, entity, intent, emotion, and/or the weight associated with each of the plurality of discrete segments. A model, classifier, or other suitable set of instructions may receive as input, each of the weighted discrete segments and corresponding severity, entity, intent, and/or emotion. Based on the input the model, classifier, or other suitable set of instructions may determine the next best action. The model, classifier, or other suitable set of instructions may consider the severity. If the severity is high or escalated, the next action may be to transfer the call to an agent capable of handling high severity interactions. If the severity is normal, then each emotion, intent, and entity in relation to the weight of each of the plurality of discrete segments may be considered. Based on these inputs the next action may be determined.

As shown by operation 626, the apparatus 200 includes means, such as emotion prediction circuitry 216, entity and intent prediction circuitry 218, call processing circuitry 220 or the like, for executing the next best action. The next best action may include transferring the call to an agent, transferring the call to a particular agent capable of handling particular emotions and/or intents, transferring the call to an agent or IVR related to a particular entity, and/or prompting a user response via a particular question, among other actions.

As shown by operation 628, the apparatus 200 includes means, such as call processing circuitry 220 or the like, for determining whether the call is ended. The call processing circuitry 220 may scan or check an input from an IVR or agent, to determine whether the call has ended. In another embodiment, the call processing circuitry 220 may determine whether the call has ended when no further reply or speech is detected. If the call has not ended, the process or operations of FIGS. 6A-6C may be repeated. Otherwise, if the call has ended, the next operation 630 may be executed.

As shown by operation 630, the apparatus 200 includes means, such as call processing circuitry 220 or the like, for determining whether an agent processed or participated on the call. The call processing circuitry 220 may track calls and flag or set an indicator when a call is transferred to a live agent. If a live agent does not speak to the customer, then the next operation performed is operation 632, otherwise a live agent spoke to the customer and the next operation executed is operation 634.

As shown by operation 632, the apparatus 200 includes means, such as call processing circuitry 220 or the like, for analyzing call routing at execution of each next best action in relation to determined emotion, entity, and intent. In an embodiment, the call processing circuitry 220 may analyze the performance of any IVR utilized for a customer call. The call processing circuitry 220 may utilize such analysis to amend, add, or remove questions. The call processing circuitry 220 may further utilize analysis to determine whether the proper IVR was utilized. Based on incorrect uses or different ratings, the data for a particular set of operations and the outcome of the operations may be utilized to re-train or fine-tune any model or classifier described herein.

As shown by operation 634, the apparatus 200 includes means, such as call processing circuitry 220 or the like, for analyzing agent performance in relation to determined emotion, entity, and intent. The call processing circuitry 220 may determine the performance or update the performance of particular agent. Factors utilized in determining performance may include the customer's emotion at the end of the call, whether the customer reached a resolution, the length of the call, the change in states of emotions of the customer, and/or the states of emotions of the agent, among other factors. As such, all predictions or determinations described above may be saved or stored for use in such performance determinations.

Figure 7A:
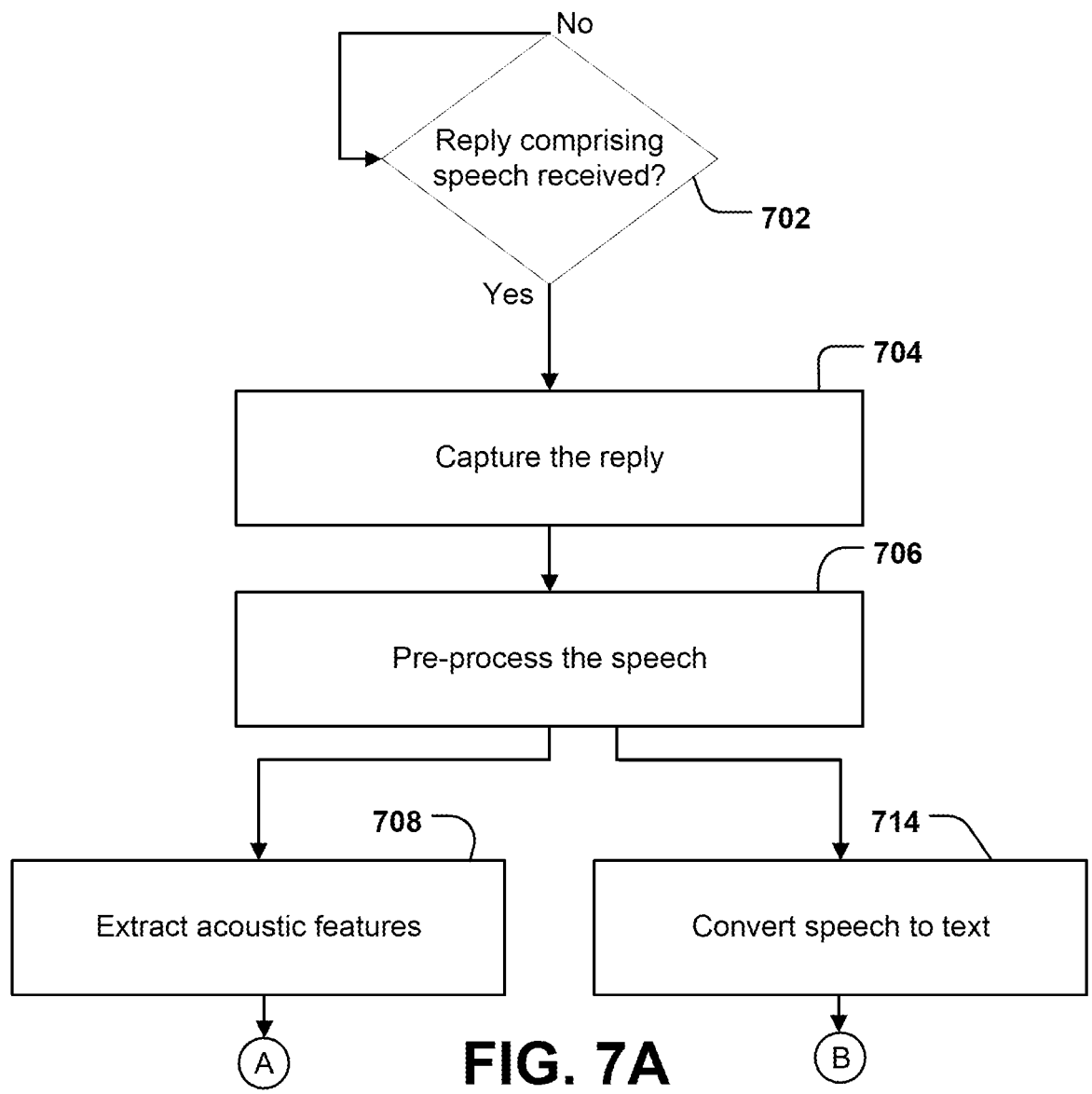
FIGS. 7A, 7B, and 7C illustrate example flowcharts for generating an emotion prediction and determining a next best action or call routing, in accordance with some example embodiments described herein.
Figure 7B:
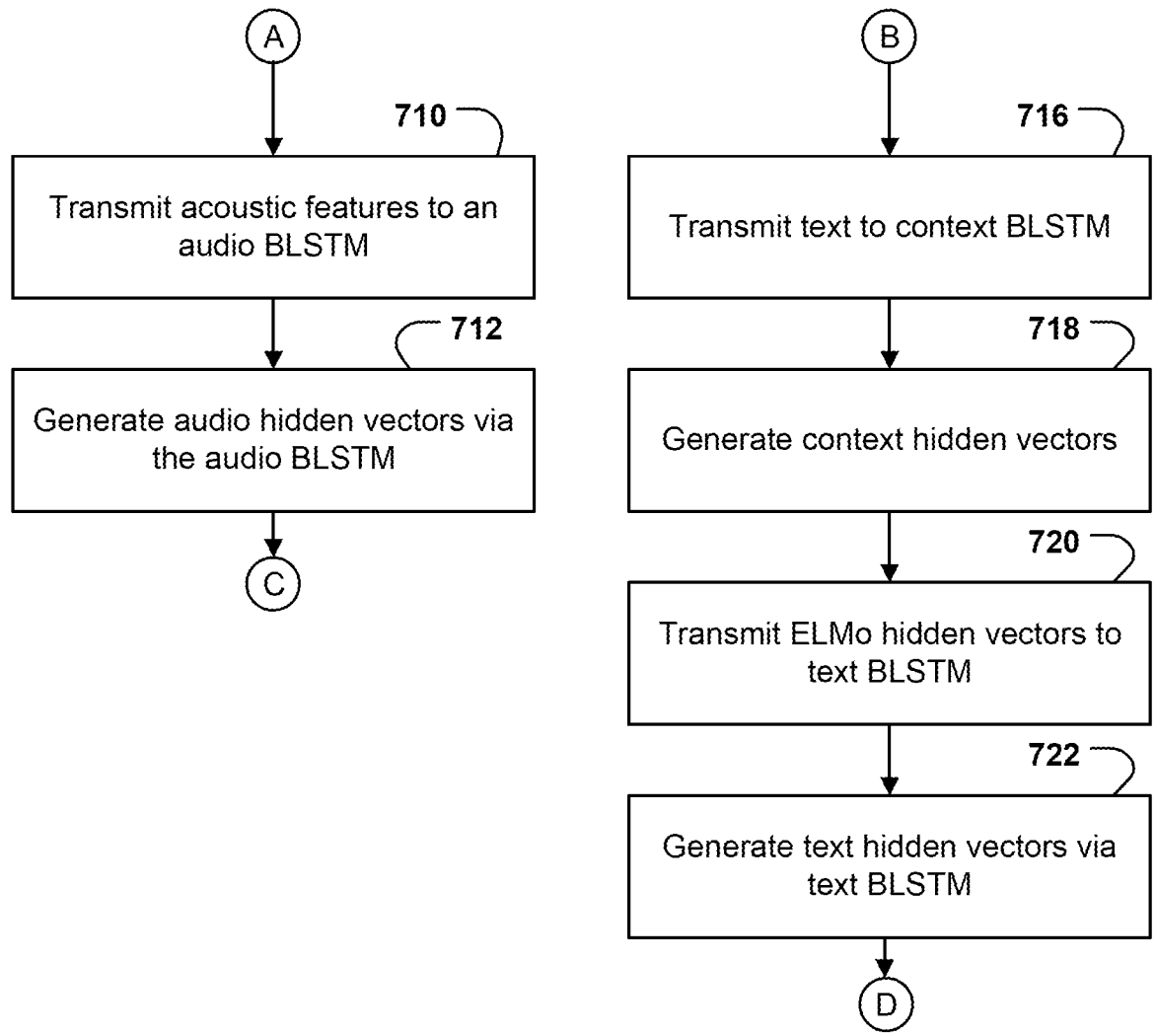
Figure 7C:
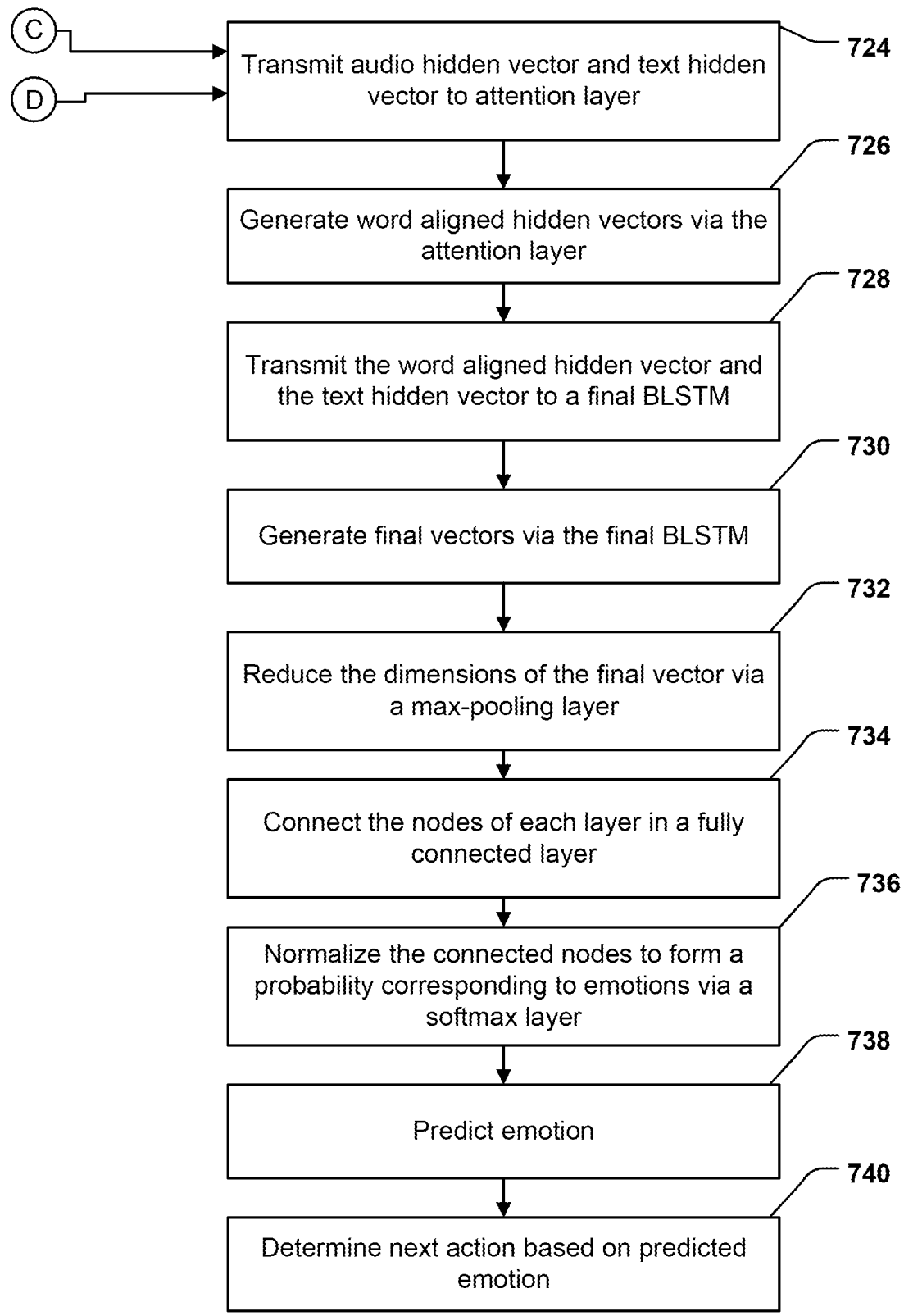

Turning to FIGS. 7A, 7B, and 7C, example flowcharts are illustrated that contain example operations implemented by example embodiments described herein. The operations illustrated in FIGS. 7A through 7C may, for example, be performed by system device 104 of the emotion, intent, and entity prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, call processing circuitry 220, and/or any combination thereof. It will be understood that user interaction with the emotion, intent, and entity prediction system 102 may occur directly via input-output circuitry 208, or may instead be facilitated by a separate IVR 112A-112N, as shown in FIG. 1, and which may have similar or equivalent physical componentry facilitating such user interaction. Further, the prediction of emotion may be one prediction or data point, used in conjunction with entity and intent determination or prediction, to determine the next best action. As such, FIGS. 7A through 7C describe the process for predicting emotion, as referenced in FIG. 6B and operation 622.

As shown by operation 702, the apparatus 200 includes means, such as processor 202, communications circuitry 206, input-output circuitry 208, Speech pre-processing circuitry 210, or the like, for determining whether a reply has been given or is being given in response to the prompt or question. Such a feature may be performed in IVR circuitry or systems, such as any of the IVRs 112A-112N, or other automated systems.

As shown by operation 704, the apparatus 200 includes means, such as processor 202, communications circuitry 206, input-output circuitry 208, Speech pre-processing circuitry 210, or the like, for capturing speech from a customer. Speech or a reply may be captured in response to a determination that a customer has or is beginning to reply. The capture of speech may be performed in response to a customer providing a vocal response to a prompt. As the customer starts speaking, the customer's response may be recorded by, for example, the speech pre-processing circuitry 210 or other circuitry included in apparatus 200. As the customer proceeds through different responses, each segment of speech may be recorded. In another example, the customer may be responding to an agent. In addition to the capture of the customer's speech, the agent's speech may be captured and processed. As such, emotion may be predicted for a customer, an agent, and/or some other user.

As shown by operation 706, the apparatus 200 includes means, such as Speech pre-processing circuitry 210 or the like, for pre-processing the speech. The speech pre-processing circuitry 210 may reduce any noise, background noises, other voices not relevant to the conversation, and/or other anomalies. The speech pre-processing circuitry 210 may reduce noise, background noise, background voices, and/or other noise, by amplifying high frequencies and/or via other denoising techniques as will be understood by those skilled in the art. Further, speech pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined. In another embodiment, this pre-processing step may break the speech into separate sentences and each sentence may be analyzed as described in greater detail below. Speech pre-processing may also include separating the speech into a plurality of discrete segments defined by the time each discrete segment is received. Each discrete segment may then be further processed. Speech pre-processing may further include weighting each of the plurality of discrete segments. Such a weighting may affect or be utilized in determining the next bet action. From operation 706, the procedure advances both to operation 708, for further processing of acoustic features of the speech, and to operation 714 for further processing of the text elements of the speech.

As shown by operation 708, the apparatus 200 includes means, such as acoustic feature extraction circuitry 214 or the like, for extracting acoustic features. The acoustic feature extraction circuitry 214 may first separate and/or extract acoustic features from the pre-processed speech or audio and then output the acoustic features as an audio vector. Each acoustic feature may exhibit certain qualities useful in determining emotion. The acoustic features may include zero crossing rate, spectral centroid, spectral spread, spectral entropy, spectral flux, spectral roll-off, and/or Mel frequency cepstral coefficients. Zero crossing rate may be the rate of sign changes of the signal during the given speech. The spectral centroid may be the weighted average frequency for a given sub band. The spectral spread may be a measure of average spread of the spectrum in relation to its centroid. The spectral entropy may be an entropy computed based on a probability mass function of normalized spectrum. The spectral flux may be the squared difference between the normalized magnitudes of the successive spectra. The spectral roll-off may be the frequency under which some percentage of the total energy of the spectrum is contained. The Mel frequency cepstral coefficients may be the linear cosine transform of a log power spectrum on a nonlinear Mel scale of frequency. Once one or more of the acoustic features are determined or separated, the one or more acoustic features may be transmitted for further analysis.

As shown by operation 710 and as noted, the apparatus 200 includes means, such as acoustic feature extraction circuitry 214 or the like, for transmitting the one or more acoustic features as an audio vector to an audio BLSTM network.

As shown by operation 712, the apparatus 200 includes means, such as emotion prediction circuitry 216 or the like, for generating audio hidden vectors via an audio BLSTM network. The emotion prediction circuitry 216 may include the audio BLSTM network. The audio BLSTM network may be trained using various prior customer conversations with known emotions. The audio hidden vectors may be a vector or matrix including the acoustic feature, associated speech, and an indicator indicating an emotion. The indicator may be represented by a number, for example, a number between 0 and 1. The emotion prediction circuitry 216 may transmit or feed the audio hidden vectors into an attention layer, as described below in connection with operation 724.

As noted previously, operation 714 may be reached from operation 706 in order to further process text that may be extracted from the speech. As shown by operation 714, the apparatus 200 includes means, such as ASR circuitry 212 or the like, for converting the speech to text. The ASR circuitry 212 may convert a portion or all of a customer's and/or agent's response. In other words, when determining emotion of a customer, the ASR circuitry 212 may convert the customer's speech to text, while when determining emotion of an agent, the ASR circuitry 212 may convert the agent's speech to text. In another embodiment, the ASR circuitry 212 may convert the customer's and agent's speech to text. In another embodiment, the ASR circuitry 212 may convert each of the plurality of discrete segments to text. In yet another embodiment, the ASR circuitry 212 may convert audio to text and the separate the text into a plurality of discrete segments.

As shown by operation 716, the apparatus 200 includes means, such as processor 202, memory 204, communications circuitry 206, emotion prediction circuitry 216, or the like, for transmitting the text may to a context BLSTM network or an ELMo.

As shown by operation 718, the apparatus 200 includes means, such as emotion prediction circuitry 216 or the like, for generating context hidden vectors or ELMo hidden vectors. The emotion prediction circuitry 216 may utilize the context BLSTM network or ELMo to generate a context or ELMo hidden vector for a series of words included in the text. The context BLSTM network or ELMo may be trained with a large text corpus. The context BLSTM network or ELMo may produce a vector distinguishing between different words used by a customer or agent.

As shown by operation 720, the apparatus 200 includes means, such as processor 202, memory 204, communications circuitry 206, emotion prediction circuitry 216, or the like, for the transmission of the context or ELMo hidden vector to a text BLSTM network.

As shown by operation 722, the apparatus 200 includes means, such as emotion prediction circuitry 216 or the like, for generating text hidden vectors via the text BLSTM network. The text BLSTM network may be trained using similar customer calls with known or determined emotions. The text BLSTM network may include a larger training data set, as additional text with determined emotions is available. The emotion prediction circuitry 216 may utilize the text BLSTM network to generate a text hidden vector.

As shown by operation 724, the apparatus 200 includes means, such as processor 202, memory 204, communications circuitry 206, emotion prediction circuitry 216, or the like, for transmitting the audio hidden vector and text hidden vector to an attention layer.

As shown by operation 726, the apparatus 200 includes means, such as emotion prediction circuitry 216 or the like, for generating or determining, via an attention layer, alignment between hidden vectors, thereby forming a word aligned hidden vector. The emotion prediction circuitry 216 may utilize the word aligned hidden vector to predict emotion.

As shown by operation 728, the apparatus 200 includes means, such as processor 202, memory 204, communications circuitry 206, emotion prediction circuitry 216, or the like, for transmitting the word aligned hidden vector and the text hidden vector to a final BLSTM network.

As shown by operation 730, the apparatus 200 includes means, such as emotion prediction circuitry 216 or the like, for generating the final vectors via the final or additional BLSTM network. The emotion prediction circuitry 216 may utilize the final or additional BLSTM network to further refine the final vector prior to final processing and prediction.

As shown by operation 732, the apparatus 200 includes means, such as processor 202, memory 204, communications circuitry 206, emotion prediction circuitry 216, or the like, for reducing the dimensions of the final vector via a max-pooling layer which, in turn, avoids high complexity in the following fully connected network.

As shown by operation 734, the apparatus 200 includes means, such as emotion prediction circuitry 216, or the like, for connecting the nodes of each layer from the max-pooling layer via a fully connected layer to thereby produce an M-dimensional vector, where M is the number categories of emotions that are considered.

As shown by operation 736, the apparatus 200 includes means, such as emotion prediction circuitry 216, or the like, for normalizing the connected nodes to form a probability corresponding to emotions via a Softmax module or layer. The Softmax module or layer takes the M-dimensional vector from the fully connected layer and normalizes it into a probability distribution consisting of M probabilities. Thus, the output of the Softmax module or layer consists of values between 0 and 1

As shown by operation 738, the apparatus 200 includes means, such as emotion prediction circuitry 216, or the like, for predicting the customer's and/or agent's emotions. The emotion prediction circuitry 216 may determine or predict the customer's and/or agent's emotion based on the output from the Softmax module or layer. For example, a series of the probabilities may be output from the Softmax module or layer for each of the M probabilities. The emotion prediction circuitry 216 may select the emotion with the highest probability as the predicted emotion. In another example, the emotion prediction circuitry 216 may predict emotion based on a combination of the probabilities output from the Softmax module or layer.

As shown by operation 740, the apparatus 200 includes means, such as emotion prediction circuitry 216, call processing circuitry 220, or the like, for determining the next action or best action based on the predicted emotion. The emotion prediction circuitry 216 or call processing circuitry 220 may determine the next action or best action based on the predicted emotion and other factors. Other factors may include, whether the customer is on a call with an IVR or a live agent, a live agent's call handling history, a live agent's rating, a live agent's experience, a live agent's availability, the context of the customer's call (as determined by the context BLSTM network or ELMo), how long a customer has been waiting, a personalized product or service recommendation, one or more predicted emotions, one or more predicted intents, one or more predicted entities, and/or the weight of the one or more predicted emotions, one or more predicted intents, one or more predicted entities.

In another embodiment, the operations illustrated in FIGS. 7A through 7C may be an iterative or continuous process. As a customer calls in, the customer may give more than one response in reply to various prompts from an IVR or agent. Further, a customer's emotion may change as a call or interaction progresses. As such, emotion may be predicted at each portion of the customer interaction. Further, the next best action may change after each portion of a conversation, based on the current or most recently predicted emotion, as well as previous predictions for the current call or interaction. Further still, emotions predicted at different times may be weighted differently based on the time of the prediction in relation to the call or interaction. Further, each incoming reply may be segmented into a plurality of discrete segments and each of the plurality of discrete segments may be weighted differently based on time received and/or other factors. The apparatus 200 includes means, such as the emotion prediction circuitry 216 or call processing circuitry 220, to determine which portion of a call or conversation an emotion is being predicted for, e.g., the beginning, the end, or a portion in between. The emotion prediction circuitry 216 or call processing circuitry 220 may weight the predicted emotion based on the time of the portion of the call. For example, an earlier prediction may be given a higher weight than a later prediction, when determining a next best action. In another example, the later predicted emotion may be given a higher weight than the earlier predicted emotion. Further, weight may be given to emotions based on changes from previous emotions (e.g., from happy to angry).

In addition to the customer's emotion, an agent's emotion may be predicted. The agent's emotion may be utilized to determine the agent's performance or to create a history of emotions in response to particular customer emotions. Such a history may be utilized when determining next best actions for a particular customer call or interaction.

Once the next action or best action has been determined, the call processing circuitry 220 may execute such an action. For example, if the next action is determined to be a re-route of a call from an IVR to a live agent, then the call processing circuitry 220 may transfer the call based on that determined next action.

Figure 8A:
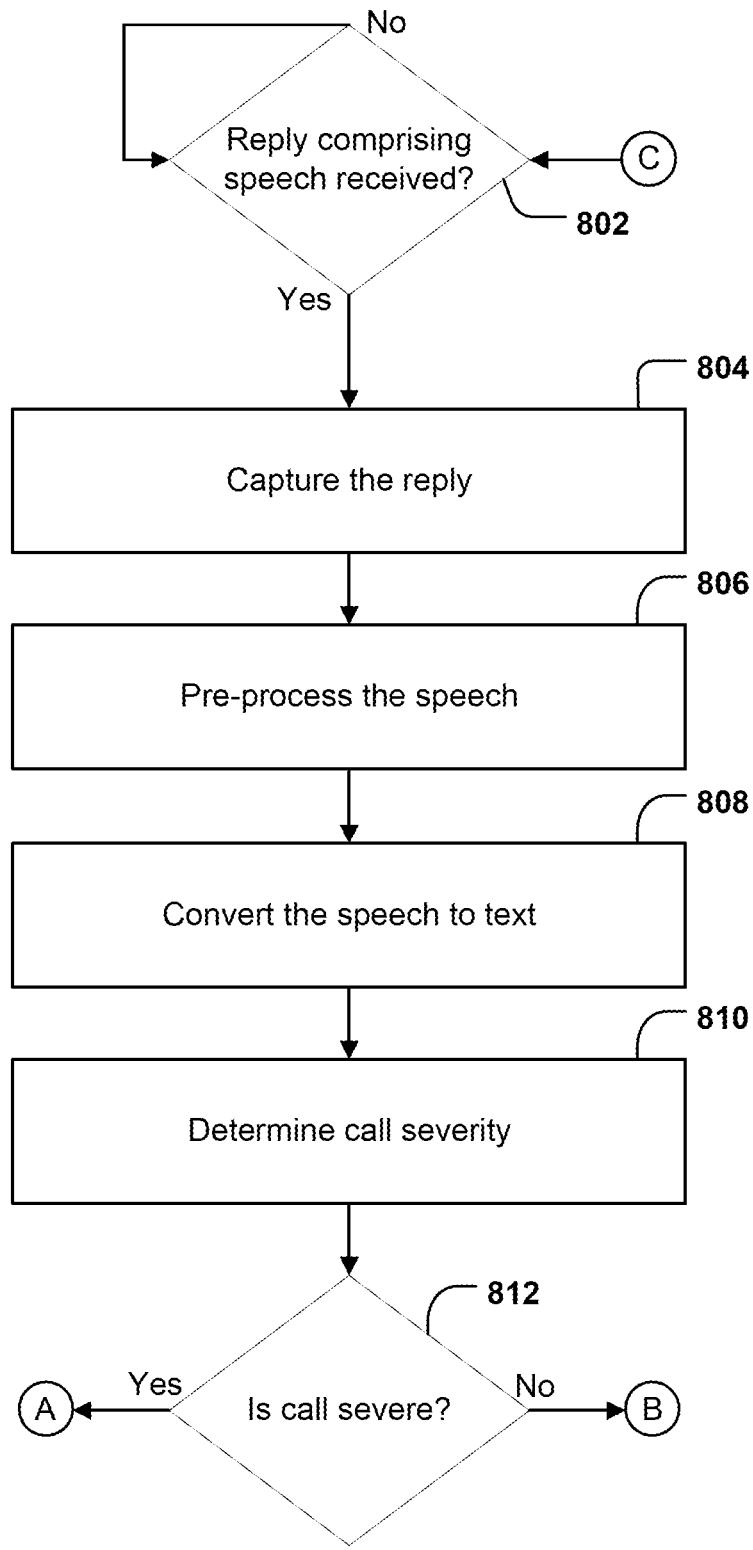
FIGS. 8A and 8B illustrate example flowcharts for generating an entity and intent prediction and determining a next best action or call routing, in accordance with some example embodiments described herein.
Figure 8B:
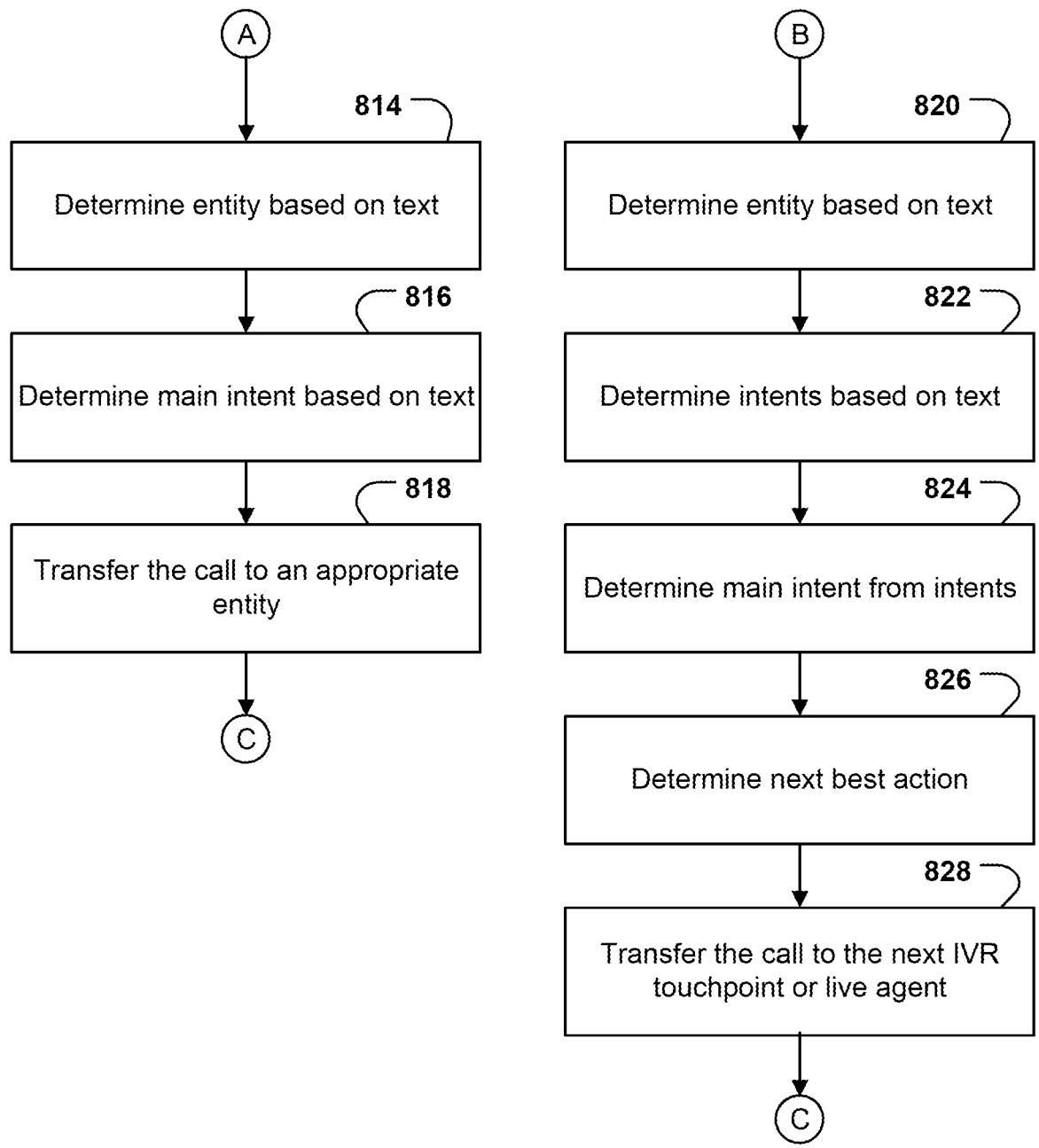

Turning to FIGS. 8A and 8B, example flowcharts are illustrated that contain example operations implemented by example embodiments described herein. The operations illustrated in FIGS. 8A and 8B may, for example, be performed by system device 104 of the emotion, intent, and entity prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, entity and intent prediction circuitry 218, call processing circuitry 220, and/or any combination thereof. It will be understood that user interaction with the emotion, intent, and entity prediction system 102 may occur directly via input-output circuitry 208, or may instead be facilitated by a separate IVR 112A-112N, as shown in FIG. 1, and which may have similar or equivalent physical componentry facilitating such user interaction. Further, the prediction of entity and intent may be one prediction or data point, used in conjunction with emotion determination or prediction, to determine the next best action. As such, FIGS. 8A and 8B describe the process for predicting entity and intent, as well as severity, as referenced in FIG. 6B and operations 616, 618, and 620.

As shown by operation 802, the apparatus 200 includes means, such as processor 202, communications circuitry 206, input-output circuitry 208, Speech pre-processing circuitry 210, or the like, for determining whether a reply has been given or is being given in response to the prompt or question. Such a feature may be performed in IVR circuitry or systems, such as any of the IVRs 112A-112N, or other automated systems.

As shown by operation 804, the apparatus 200 includes means, such as processor 202, communications circuitry 206, input-output circuitry 208, Speech pre-processing circuitry 210, or the like, for capturing speech from a customer. Speech or a reply may be captured in response to a determination that a customer has or is beginning to reply. The capture of speech may be performed in response to a customer providing a vocal response to a prompt. As the customer starts speaking, the customer's response may be recorded by, for example, the speech pre-processing circuitry 210 or other circuitry included in apparatus 200. As the customer proceeds through different responses, each segment of speech may be recorded. In another example, the customer may be responding to an agent. In addition to the capture of the customer's speech, the agent's speech may be captured and processed. As such, intent may be predicted for a customer, an agent, and/or some other user.

As shown by operation 806, the apparatus 200 includes means, such as Speech pre-processing circuitry 210 or the like, for pre-processing the speech. The speech pre-processing circuitry 210 may reduce any noise, background noises, other voices not relevant to the conversation, and/or other anomalies. The speech pre-processing circuitry 210 may reduce noise, background noise, background voices, and/or other noise, by amplifying high frequencies and/or via other denoising techniques as will be understood by those skilled in the art. Further, speech pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined.

As shown by operation 808, the apparatus 200 includes means, such as ASR circuitry 212 or the like, for converting the speech to text. The ASR circuitry 212 may convert a portion or all of a customer's and/or agent's response. In other words, when determining emotion of a customer, the ASR circuitry 212 may convert the customer's speech to text, while when determining emotion of an agent, the ASR circuitry 212 may convert the agent's speech to text. In another embodiment, the ASR circuitry 212 may convert the customer's and agent's speech to text. In another embodiment, the ASR circuitry may convert each of the plurality of discrete segments to text. In yet another embodiment, the ASR circuitry may convert audio to text and the separate the text into a plurality of discrete segments.

As shown by operation 808, the apparatus 200 includes means, such as speech pre-processing circuitry 210, ASR circuitry 212, entity and intent prediction circuitry 218 or the like, for determining a call severity. The severity of a call may be determined by transmitting the text of the call or context hidden vectors, as generated by a context BLSTM network, to a trained machine learning model or classifier. The machine learning model or classifier may output a probability or likelihood indicating the severity of a call. Such a probability or likelihood may be indicated by a number between 0 and 1. Based on a predefined threshold, an output above such a threshold may indicate the call is severe, while an output at or below such a threshold may indicate that the call is a regular call.

As shown by operation 812, the apparatus 200 includes means, such as speech pre-processing circuitry 210, ASR circuitry 212, entity and intent prediction circuitry 218 or the like, for, based on a whether a call is severe or not, proceeding to perform specified operations. If the call is determined to be severe, the call may proceed to operation 814 to determine intent and entity, and then transfer to an appropriate agent, as described below. If the call is determined to be a regular call, the call may proceed to operation 820 to determine intent, entity, and next best action, and then execution of the next best action.

As shown by operation 814, the apparatus 200 includes means, such as entity and intent prediction circuitry 218 or the like, for determining an entity based on text. The entity and intent prediction circuitry 218 may include a model or classifier to determine one or more entities for a discrete segment. The model or classifier may, based on the input (e.g., the discrete segment or a context hidden vector), generate one or more probabilities or likelihoods that the input is indicating one or more entities. In another embodiment, the output may indicate a most likely entity. In yet another embodiment, the output may indicate a main entity and potential sub-entities. For example, a customer may call to discuss a missed mortgage payment, but also mention a potential personal loan or credit card. In such an example, based on a customer's speech, a main entity may be identified, via output from the entity and intent prediction circuitry 218, as being related to mortgages, while a sub-entity may be identified, entity and intent prediction circuitry 218, related to personal loans or credit.

As shown by operation 816, the apparatus 200 includes means, such as entity and intent prediction circuitry 218 or the like, for determining a main intent based on the text. The entity and intent prediction circuitry 218 may include a model or classifier to determine one or more intents for a discrete segment. The model or classifier may, based on the input (e.g., the discrete segment or a context hidden vector), generate one or more probabilities or likelihoods that the input is indicating one or more intents. In another embodiment, the output may indicate a most likely intent. In yet another embodiment, the output may indicate a main intent and potential sub-intents. The main intent may be determined based on a ranking of each intent. The highest ranked intent may be classified as the main intent. The remaining intents may be considered sub-intents As shown by operation 818, the apparatus 200 includes means, such as call processing circuitry 220 or the like, for transferring the call to the appropriate agent. The appropriate agent may be determined based on the one or more determined intents or main intent and an entity or one or more entities.

As shown by operation 820, the apparatus 200 includes means, such as entity and intent prediction circuitry 218 or the like, for determining an entity based on the text. The entity and intent prediction circuitry 218 may include a model or classifier to determine one or more entities for a discrete segment. The model or classifier may, based on the input (e.g., the discrete segment or a context hidden vector), generate one or more probabilities or likelihoods that the input is indicating one or more entities. In another embodiment, the output may indicate a most likely entity. In yet another embodiment, the output may indicate a main entity and potential sub-entities. For example, a customer may call to discuss a missed mortgage payment, but also mention a potential personal loan or credit card. In such an example, based on a customer's speech, a main entity may be identified, via output from the entity and intent prediction circuitry 218, as being related to mortgages, while a sub-entity may be identified, entity and intent prediction circuitry 218, related to personal loans or credit.

As shown by operation 822, the apparatus 200 includes means, such as entity and intent prediction circuitry 218 or the like, for determining intents based on the text. The entity and intent prediction circuitry 218 may include a model or classifier to determine one or more intents for a discrete segment. The model or classifier may, based on the input (e.g., the discrete segment or a context hidden vector), generate one or more probabilities or likelihoods that the input is indicating one or more intents. In another embodiment, the output may indicate a most likely intent.

As shown by operation 824, the apparatus 200 includes means, such as entity and intent prediction circuitry 218 or the like, for determining a main intent from the intents. In yet another embodiment, the output may indicate a main intent and potential sub-intents. The main intent may be determined based on a ranking of each intent. The highest ranked intent may be classified as the main intent. The remaining intents may be considered sub-intents As shown by operation 826, the apparatus 200 includes means, such as entity and intent prediction circuitry 218, call processing circuitry 220, or the like, for determining a next best action. A model, classifier, or other suitable set of instructions may receive as input, each of the weighted discrete segments and corresponding severity, entity, and/or intent. Based on the input the model, classifier, or other suitable set of instructions may determine the next best action. The next best action may include transferring the call to an agent, transferring the call to a particular agent capable of handling particular emotions and/or intents, transferring the call to an agent or IVR related to a particular entity, and/or prompting a user response via a particular question, among other actions.

As shown by operation 828, the apparatus 200 includes means, such as call processing circuitry 220 or the like, for transferring the call to the next IVR touchpoint or a live agent. The call processing circuitry 220 may execute the next best action.

In an embodiment, the system may continue to scan for responses and continue to perform the operations as described for FIGS. 8A and 8B until the call has ended or a new call has begun.

As described above, example embodiments provide methods and apparatuses that enable improved emotion, intent, and entity prediction and call resolution. Example embodiments thus provide tools that overcome the problems faced by typical emotion prediction systems or intent prediction systems. By utilizing text and audio vectors, a more accurate emotion prediction may be made. The additional use of intent and entity prediction further enables prompt and proper resolution and increased customer satisfaction. Moreover, embodiments described herein improve accuracy of predictions. The use of multiple machine learning algorithms, re-trained or refined by data produced in each subsequent execution of operations, provide for a more accurate prediction, ensuring a customer's call is resolved.

As these examples all illustrate, example embodiments contemplated herein provide technical solutions that solve real-world problems faced during customer calls with customers exhibiting anger or otherwise unsatisfactory emotions. And while customer satisfaction has been an issue for decades, the introduction of IVRs has introduced longer wait times and further frustrated customers, as navigation takes time and does not always result in proper call routing. As the demand for faster resolution times and customer satisfaction significantly grows, a solution to resolve this issue does not exist. At the same time, the recently arising ubiquity of speech capture and machine learning has unlocked new avenues to solving this problem that historically were not available, and example embodiments described herein thus represent a technical solution to these real-world problems.

FIGS. 4A through 8B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contem-

What is claimed is:

1. A method for predicting an entity, intent, and emotion based on weighted and segmented portions of captured speech, the method comprising:
   receiving, by communications circuitry, a reply comprising speech;
   converting, by automatic speech recognition circuitry, speech to text;
   separating, by the automatic speech recognition circuitry, the text into a plurality of discrete segments, each of the plurality of discrete segments corresponding to a respective specific time;
   causing, by one or more of the speech pre-processing circuitry, the automatic speech recognition circuitry, an entity and intent prediction circuitry, and an emotion prediction circuitry, generation of metadata including an entity, an intent, an emotion, and a weight associated with each of the entity, the intent, the emotion; and
   determining, by call processing circuitry, a next action based on the metadata.

2. The method of claim 1, wherein the reply is a portion of a call, and wherein the method further comprises:
   determining, by the call processing circuitry, if the call has ended; and
   in response to a determination that the call has ended, determining, by the call processing circuitry, if an agent processed the call.

3. The method of claim 2, further comprising:
   in an instance in which the call has ended and an agent processed the call, analyzing, by the call processing circuitry, agent performance in relation to one or more of the determined entity, intent, and predicted emotion.

4. The method of claim 2, further comprising:
   in an instance in which the call has ended and an agent did not process the call, analyzing, by the call processing circuitry, call routing at execution of each next action in relation to one or more of the determined entity, intent, and predicted emotion.

5. The method of claim 1, wherein the generation of metadata comprises:
   weighting, by automatic speech recognition circuitry, each of the plurality of discrete segments based on the respective specific time to which it corresponds;
   determining, by the entity and intent prediction circuitry, an entity related to each of the plurality of discrete segments;
   causing, by the entity and intent prediction circuitry and for each of the plurality of segments, generation of an intent for each of the plurality of discrete segments; and
   causing, by emotion prediction circuitry and for each of the plurality of segments, generation of a predicted emotion for each of the plurality of discrete segments.

6. The method of claim 5, wherein the weighting of each discrete segment of the plurality of discrete segments is further based on the predicted emotion for that discrete segment.

7. The method of claim 5, further comprising, prior to determining a next action, determining, by the entity and intent prediction circuitry and for each of the plurality of discrete segments, a severity for each of the plurality of discrete segments, and wherein the metadata used for determining the next action includes the severity.

8. The method of claim 5, wherein the severity is either a regular severity or an escalated severity.

9. The method of claim 8, wherein, if the severity is an escalated severity, the next action includes transferring a call associated with the text to an agent.

10. The method of claim 5, wherein discrete segments are weighted based on the respective specific times to which they correspond.

11. The method of claim 5, further comprising:
    prior to determining the entity for each of the plurality of discrete segments and causing generation of the intent and the predicted emotion for each of the plurality of segments:
       causing, by the speech pre-processing circuitry and for each of the plurality of discrete segments, generation of a context word vector using one of the plurality of discrete segments and a context Bidirectional Long Short-Term Memory (BLSTM) network.

12. The method of claim 11, further comprising:
    causing, by the entity and intent prediction circuitry and for each of the plurality of discrete segments, generation of potentially related entities using the context word vector and a named entity recognition model,
    wherein the determination of the entity is further based on the potentially related entities.

13. The method of claim 12 further comprising:
    causing, by the entity and intent prediction circuitry and for each of the plurality of discrete segments, generation of one or more ranked intents based on the context word vector and a support vector machine (SVM) classifier,
    wherein generation of the intent is further based on the one or more ranked intents.

14. An apparatus for predicting an entity, intent, and emotion based on weighted and segmented portions of captured speech, the apparatus comprising:
    communications circuitry configured to receive a reply comprising speech;
    automatic speech recognition circuitry configured to:
       convert the speech to text, and
       separate the text into a plurality of discrete segments, each of the plurality of discrete segments corresponding to a respective specific time;
    entity and intent prediction circuitry configured to:
       cause generation of metadata including an entity, an intent, an emotion, and a weight associated with each of the entity, the intent, the emotion; and
    call processing circuitry configured to determine a next action based on the metadata.

15. The apparatus of claim 14, wherein the weighting each of the plurality of discrete segments is based on the emotion for each of the plurality of discrete segments.

16. The apparatus of claim 14, wherein the respective specific time is a time when a particular discrete segment is received.

17. The apparatus of claim 16, wherein discrete segments are weighted based on the respective specific times to which they correspond.

18. A computer program product for predicting an entity, intent, and emotion based on weighted and segmented portions of captured speech, the computer program product comprising at least one non-transitory computer-readable storage medium storing software instructions that, when executed, cause an apparatus to:
    in response to a reply, capture speech;
    convert the speech to text;

separate the text into a plurality of discrete segments, each of the plurality of discrete segments corresponding to a respective specific time;

cause generation of metadata including an entity, an intent, an emotion, and a weight associated with each of the entity, the intent, the emotion; and determining a next action based on the metadata.

19. The computer program product of claim 18, wherein the metadata includes a severity for each of the plurality of discrete segments.

20. The computer program product of claim 18, wherein the next action comprises one or more of re-directing a call from an IVR menu to another IVR menu, selecting an agent based on the metadata, generating a customer's personalized product or service recommendation, re-directing a call based on the customer's personalized product or service recommendation, determining an agent's rating or ranking, generating a call back for a customer, or transferring a call from the IVR menu to an agent.

\* \* \* \* \*